(12) United States Patent
Izumi et al.

(10) Patent No.: US 7,304,798 B2
(45) Date of Patent: Dec. 4, 2007

(54) SPECTROSCOPIC APPARATUS

(75) Inventors: Hirotomo Izumi, Kawasaki (JP);
Hiroshi Nagaeda, Yokohama (JP);
Nobuaki Mitamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 233 days.

(21) Appl. No.: 10/792,747

(22) Filed: Mar. 5, 2004

(65) Prior Publication Data

US 2005/0046837 A1 Mar. 3, 2005

(30) Foreign Application Priority Data

Sep. 3, 2003 (JP) ............................. 2003-310945

(51) Int. Cl.
*G01B 9/02* (2006.01)
*G02B 27/00* (2006.01)

(52) U.S. Cl. ...................... 359/577; 359/578; 356/454

(58) Field of Classification Search ................ 356/326, 356/334, 328, 454; 359/577–579, 615
See application file for complete search history.

(56) References Cited

U.S. PATENT DOCUMENTS

| | | | |
|---|---|---|---|
| 3,485,552 A | 12/1969 | Adler | |
| 5,218,422 A * | 6/1993 | Zoechbauer | 356/454 |
| 5,969,865 A | 10/1999 | Shirasaki | |
| 5,969,866 A | 10/1999 | Shirasaki | |
| 5,973,838 A | 10/1999 | Shirasaki | |
| 5,999,320 A | 12/1999 | Shirasaki | |
| 6,344,910 B1 | 2/2002 | Cao | |
| 7,002,696 B1 * | 2/2006 | Miron | 356/519 |
| 2003/0128431 A1 | 7/2003 | Mitamura et al. | |

FOREIGN PATENT DOCUMENTS

| | | |
|---|---|---|
| EP | 1237308 | 9/2002 |
| FR | 2 765 971 | 1/1999 |
| WO | 98/35259 | 8/1998 |

OTHER PUBLICATIONS

Patent Abstracts of Japan, Pub. No. 2000-028849 (1999).
Patent Abstracts of Japan, Pub. No. 09-043057 (1995).

(Continued)

*Primary Examiner*—Gregory J. Toatley, Jr.
*Assistant Examiner*—Jonathan Skovholt
(74) *Attorney, Agent, or Firm*—Staas & Halsey, LLP

(57) ABSTRACT

A spectroscopic apparatus which is compact in size and performs high-precision light-splitting with a large angular dispersion. An optical input-processing section outputs a filtered transmitted light, using a bandpass filter that transmits only wavelength bands at one period of an input light, and collects the filtered transmitted light to generate a collected beam. An optic includes a first reflection surface and a second reflection surface which are high but asymmetric in reflectivity, and causes the collected beam incident thereon to undergo multiple reflections within an inner region between the first reflection surface and the second reflection surface, to thereby cause split beams to be emitted via the second reflection surface. A received light-processing section performs received light processing of the beams emitted from the optic. A control section variably controls at least one of a filter characteristic of the bandpass filter and an optical length through the optic.

21 Claims, 39 Drawing Sheets

OTHER PUBLICATIONS

European Partial Search Report dated Jun. 29, 2006 in corresponding European Patent Application No. EP 04 00 7157.

"Large angular dispersion by a virtually imaged phased array and its application to a wavelength demultiplexer", M. Shirasaki, 2412 Optics Letters, vol. 21, No. 5, Mar. 1, 1996, pp. 366-368.

European Search Report dated Sep. 6, 2006 issued in corresponding European Application No. EP 04007157.

Patent Abstracts of Japan, Publication No. 05312844, Published Nov. 26, 1993.

Patent Abstracts of Japan, Publication No. 08220406, Published Aug. 30, 1996.

* cited by examiner

| FILM THICKNESS (nm) | REFLECTIVITY (%) |
|---|---|
| 1 | 9.5 |
| 2 | 13.3 |
| 3 | 19.3 |
| 4 | 26.3 |
| 5 | 33.5 |
| 6 | 40.4 |
| 7 | 46.8 |
| 8 | 52.4 |
| 9 | 57.4 |
| 10 | 61.7 |
| 11 | 65.4 |
| 12 | 68.7 |
| 15 | 76.2 |
| 20 | 83.8 |
| 25 | 88.1 |
| 35 | 92.4 |
| 50 | 94.8 |
| 70 | 95.6 |
| 100 | 95.9 |
| 150 | 95.9 |

SPECTROSCOPIC APPARATUS

BACKGROUND OF THE INVENTION (1) Field of the Invention

This invention relates to a spectroscopic apparatus, and more particularly to a spectroscopic apparatus associated with spectroscopic measurement in general, in which spectroscopy is performed.

(2) Description of the Related Art

Spectroscopy means operation of splitting light according to wavelength or frequency, and is utilized for optical measurement in analyzing and measuring the structure of a substance, etc. Spectrometry is widely used in various fields, including medicine and engineering.

Spectrometry includes a pre-splitting method in which light having a continuous spectrum is split and then irradiated onto a sample, and a post-splitting method in which light having a continuous spectrum is irradiated onto a sample without splitting the same and the resulting transmitted/reflected light is split. In both of the methods, the spectroscopic characteristics of a substance can be represented by a spectrum or spectra of light, and therefore, it is possible to study the structure of a substance or chemical phenomena by analyzing the spectrum or spectra of light.

For example, an organic molecule of an organ or the like has a near-infrared absorption characteristic of the molecule, and therefore, near-infrared spectrometry is utilized in analysis of the components of a tissue, by irradiating a near-infrared radiation (having a wavelength of 0.8 to 2.5 μm) onto a sample, and extracting spectroscopic information from the transmitted light or diffuse reflected light.

On the other hand, to split light, an optic called a diffraction grating is generally employed. A spectroscope using the diffraction grating performs splitting of light by irradiating the light onto the diffraction grating to thereby obtain diffracted beams having desired wavelengths.

FIGS. 38 and 39 are diagrams showing diffracted beams formed by the diffraction grating. FIG. 38 shows diffracted beams formed by a diffraction grating G1 having a glass plate formed with e.g. four grooves formed per unit length, while FIG. 39 shows diffracted beams formed by a diffraction grating G2 having a glass plate formed with e.g. eight grooves per unit length.

As can be seen from FIGS. 38 and 39, the magnitude of an opening angle (diffraction angle) between a split diffracted beam having a wavelength $\lambda 0$ and a split diffracted beam having a wavelength $(\lambda 0 + \Delta \lambda)$ depends on the number of grooves per unit length. When a diffraction angle $\theta 1$ of the diffraction grating G1 having a smaller number of grooves is compared with a diffraction angle $\theta 2$ of the diffraction grating G2 having a larger number of grooves, there holds $\theta 1 < \theta 2$.

When the diffracted beams are observed, since the diffraction grating G1 has a smaller diffraction angle, for a photodetector 105 to discriminate the respective wavelengths $\lambda 0$ and $(\lambda 0 + \Delta \lambda)$, it is required that the distance over which the diffracted beams are transmitted to the photodetector 105 is long. On the other hand, since the diffraction grating G2 has a larger diffraction angle, it is possible for the photodetector 105 to discriminate the respective wavelengths $\lambda 0$ and $(\lambda 0 + \Delta \lambda)$, with a shorter distance over which the beams are transmitted.

As described above, by designing the diffraction grating such that the number of grooves per unit length or the order employed is increased, it is possible to increase the diffraction angle. However, in actuality, due to restrictions on machining, there is a limit to increasing the number of grooves. Therefore, conventional spectroscopes have increased the resolution by increasing the distance over which diffracted beams are transmitted.

On the other hand, there has recently been developed an optical branching filter called VIPA (Virtually Imaged Phased Array). The VIPA includes a wavelength dispersion element (VIPA plate) comprised of a glass plate and reflection films coated on both sides of the glass plate. The VIPA receives a collected beam, and causes multiple reflections of the input beam to thereby split the input beam into a plurality of beams having respective wavelengths (see e.g. Japanese Unexamined Patent Publication (Kokai) No. 2000-28849 (Paragraph Nos. [0016] to [0107], FIG. 6).

Further, it has been proposed a technique of making use of the VIPA as a dispersion compensation device for correcting waveform distortions (wavelength dispersion) of an optical signal occurring when it passes through an optical fiber and restoring the signal to its original state (see e.g. Japanese PCT application translation Publication No. 2000-511655, pages 32–33, FIG. 18).

In spectroscopes using the diffraction grating described above, an increase in the resolution results in the increased size of the optical system (optics constituting an optical path over which light generated by a light source travels to a photodetector), which makes it impossible to comply with the demand of reduction of the size of spectroscopes.

Further, the VIPA is capable of wavelength splitting with a larger angular dispersion than the diffraction grating (capable of performing finer light splitting than the diffraction grating), and hence capable of reducing the size of the optical system. Therefore, the VIPA can be applied to a receiver that receives a wavelength-multiplexed signal transmitted by WDM (Wavelength Division Multiplex), whereby it is possible to reduce the size of the receiver and perform compensation for wavelength dispersion. However, it is impossible to apply the proposed VIPA as it is to a spectroscope as an optical measurement apparatus.

It should be noted that the VIPA plate as a component of the VIPA is a period filter and the spectral angle of the beams split by the VIPA plate has a wavelength periodicity. Therefore, in a VIPA-based spectroscope, when an optical signal composed of beams in wavelength bands of $\lambda 1$ to $\lambda n$ is inputted and each beam is split into light components, one of photoreceptors (PDs: Photo Diodes) constituting a photodetector receives a plurality of light components at the same position within a period of each of the wavelength bands of $\lambda 1$ to $\lambda n$.

However, as the optical measurement apparatus, the VIPA-based spectroscope is required to receive a light component (optical spectrum) obtained by splitting one wavelength (band), which makes it impossible to use such a VIPA-based spectroscope as used in WDM as it is, for the spectroscopic apparatus for optical measurement.

SUMMARY OF THE INVENTION

The present invention has been made in view of the above described points, and an object thereof is to provide a spectroscopic apparatus which is compact in size and performs high-precision light-splitting with a large angular dispersion.

To attain the above object, the present invention provides a spectroscopic apparatus that performs splitting of light. This spectroscopic apparatus comprises an optical input-processing section that forms a filtered transmitted light, and collects the filtered transmitted light to generate a collected beam, the optical input-processing section including a bandpass filter through which an input light is transmitted to form the filtered transmitted light, an optic that includes a first reflection surface and a second reflection surface and causes the collected beam incident thereon to undergo multiple reflections within an inner region between the first reflection surface and the second reflection surface, to thereby cause split beams to be emitted via the second reflection surface, and a control section that variably controls at least one of a filter characteristic of the bandpass filter and an optical length through the optic.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 20 is a diagram showing a table showing the relationship between reflectivity and the film thickness of a gold film.

DESCRIPTION OF THE PREFERRED EMBODIMENTS

Hereafter, preferred embodiments of the present invention will be described with reference to the drawings.

Figure 1:
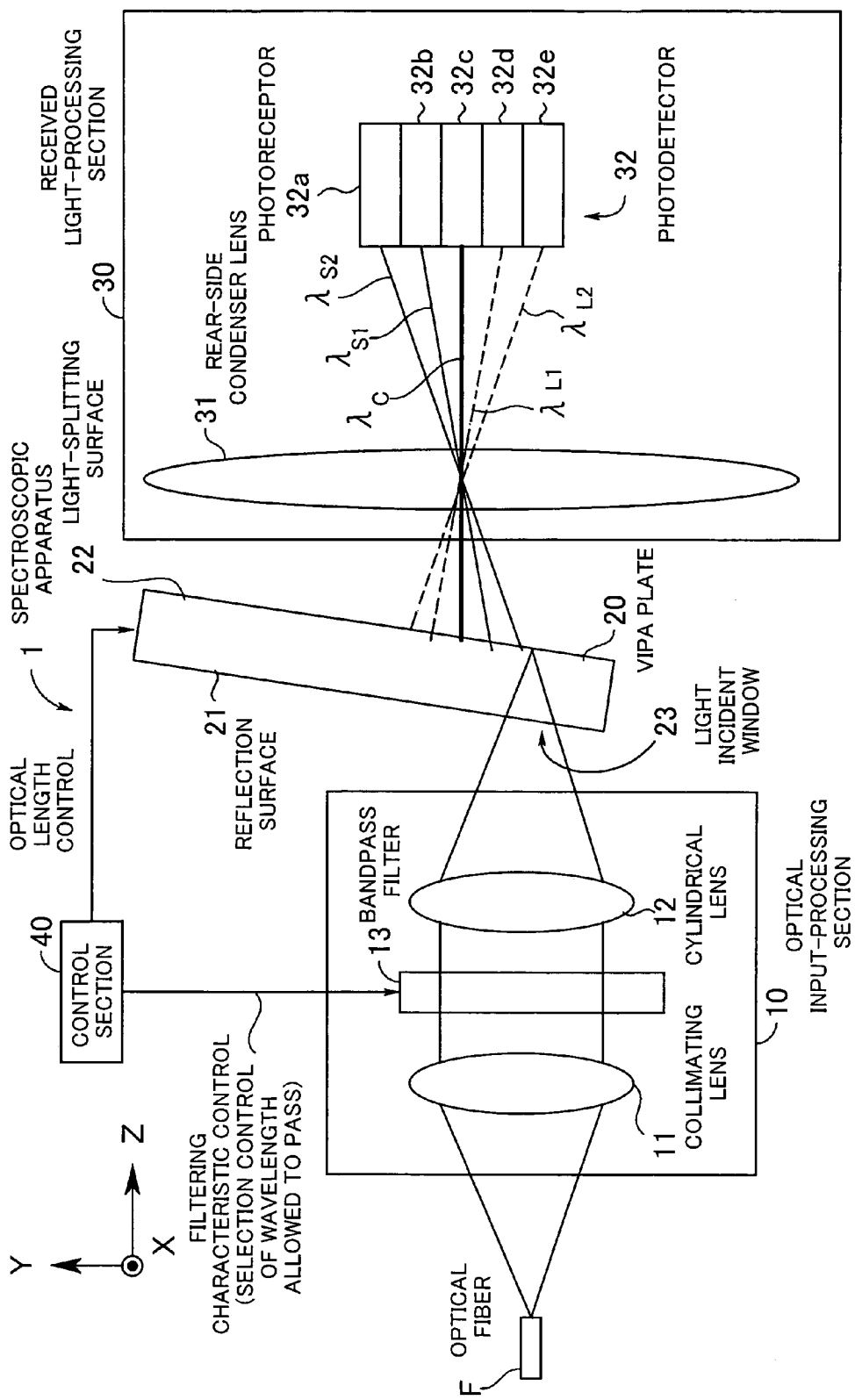
FIG. 1 is a diagram showing the basic arrangement of a spectroscopic apparatus according to a first embodiment of the present invention which is useful in explaining the principles of the present invention.

FIG. 1 is a diagram showing the basic arrangement of a spectroscopic apparatus according to a first embodiment of the present invention, which is useful in explaining the principles of the present invention. The spectroscopic apparatus 1 is an apparatus associated with spectroscopic measurement in general, in which spectroscopy is performed, and is comprised of an optical input-processing section 10, an optic 20, a received light-processing section 30, and a control section 40. The optic 20 is hereinafter referred to as "the VIPA plate 20".

The optical input-processing section 10 is comprised of a lens 11 (hereinafter referred to as "the collimating lens 11"), a front-side condenser lens 12 (hereinafter referred to as "the cylindrical lens 12"), and a bandpass filter 13, and the bandpass filter 13 is disposed between the collimating lens 11 and the cylindrical lens 12. Further, the received light-processing section 30 is comprised of a rear-side condenser lens 31 (hereinafter, simply referred to as "the condenser lens 31") and a photodetector 32.

The collimating lens 11 changes light emitted from an optical fiber F into collimated light. The bandpass filter 13 passes a wavelength band of the collimated light at only one period (performs bandpass filtering), to thereby output a filtered transmitted light. The cylindrical lens (semi-cylindrical lens) 12 collects the filtered transmitted light in a one-dimensional direction (linearly) and emits a collected beam.

The VIPA plate 20 is a glass plate having a first reflection surface 21 and a second reflection surface 22 which are high but asymmetrical in reflectivity, and a light incident window 23 through which the collected beam is incident thereon. The collected beam is subjected to multiple reflections within an inner region between the first reflection surface 21 and the second reflection surface 22, and the split light beams emerge from the second reflection surface 22.

Now, let it be assumed here that the first reflection surface 21 is a total reflection surface (having a reflectivity of 100%) or a highly reflective surface close in reflectivity to the total reflection, and the second reflection surface 22 is a highly reflective surface (having a reflectivity of 95% to 98%) which allows part of the incident light to pass. Hereafter, the first reflection surface 21 is referred to as "the reflection surface 21", and the second reflection surface 22 is referred to as "the light splitting surface 22".

When the collected beam from the cylindrical lens 12 enters the VIPA plate 20 via the light incident window 23, it undergoes multiple reflections within the inner region of the glass plate between the reflection surface 21 and the light splitting surface 22, and the split light beams emerge from the light splitting surface 22.

The condenser lens 31 collects the light beams emitted from the VIPA plate 20. The photodetector 32 is comprised of a plurality of photoreceptors (PDs), and disposed at a focal length position of the condenser lens 31, for receiving the emitted beams to detect optical spectra (it should be noted that in the present invention, each photoreceptor receives a single wavelength component of a beam at one period.)

The control section 40 variably controls at least one of the filtering characteristic of the bandpass filter 13, an optical length of light passing through the inside of the VIPA plate 20, and a photodetecting position where received light-processing section 30 detects the light beams. The control section 40 can be connected to a terminal unit, such as a personal computer, and can be controlled by external instructions given by an operator of the terminal unit (the control section 40 itself may be provided with the functions of the terminal unit).

Now, a description will be given of how the light emitted from the optical fiber F travels to the photodetector 32. The light-splitting direction is referred to as "the Y direction", the direction of the optical axis is referred to as "the Z direction", and a direction perpendicular to the light-splitting direction and the direction of the optical axis is referred to as "the X direction". The diffuse light emitted from the optical fiber F is changed into collimated light by the collimating lens 11, and a single wavelength band at a predetermined period is extracted by the bandpass filter 13, whereby filtered transmitted light is outputted.

The filtered transmitted light is collected in a one-dimensional direction into the collected beam by the cylindrical lens 12. The term "collected in a one-dimensional direction" here is intended to mean "collected in the Y direction by the cylindrical lens 12" (as if the light is compressed in the Y direction).

Thereafter, the collected beam enters the VIPA plate 20, and emerges from the light splitting surface 22 while undergoing multiple reflections within the VIPA plate 20. At this time, the multiple reflections of the incident beam occur while the reflected beam is expanded to a small degree dependent on the thickness of the glass plate, so that split beams each having a diameter dependent on the thickness of the glass plate leak from the light splitting surface 22.

The emitted light beams from the VIPA plate 20 are split in the Y direction, and therefore separation of the emitted light beams can be recognized when viewed from the X direction (from the direction perpendicular to the sheet of FIG. 1), but cannot be perceived when viewed from the Y direction.

The light beams split by the VIPA plate 20 and emitted therefrom are collected in the X direction and the Y direction (as if compressed in the X direction and the Y direction), i.e. focused to a single point. The photodetector 32 is disposed at the focal length position where the beams are focused, so that each photoreceptor can receive a single wavelength component at one period (one repetition period).

In the illustrated example, the photoreceptor 32c receives a beam having an intermediate wavelength $\lambda C$, while the photoreceptors 32b and 32a receive beams $\lambda S1$ and $\lambda S2$ having shorter wavelengths ($\lambda S2 < \lambda S1$), respectively. The photodetectors 32d and 32e receive beams $\lambda L1$ and $\lambda L2$ having longer wavelengths ($\lambda L1 < \lambda L2$), respectively.

Figure 10:
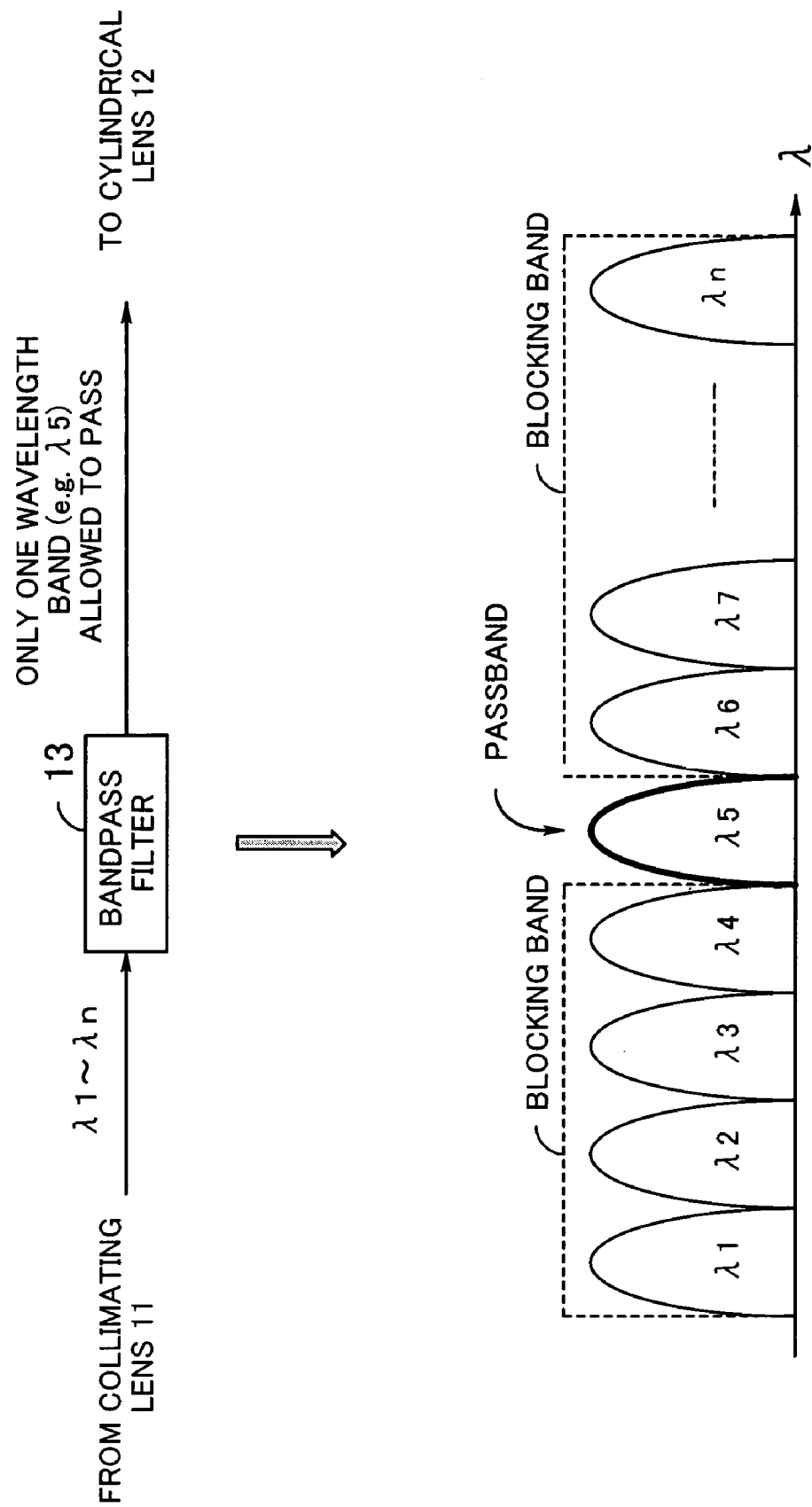
FIG. 10 is a diagram useful in explaining the function of a bandpass filter.

Next, before the present invention is described in detail (detailed description of the invention will be given hereinafter with reference to FIG. 10 et seq.), a description will be given of the construction and operation of the VIPA (see e.g. Japanese Unexamined Patent Publication No. 2000-28849, for principles of the VIPA), and the problems to be solved by the present invention.

Figure 2:
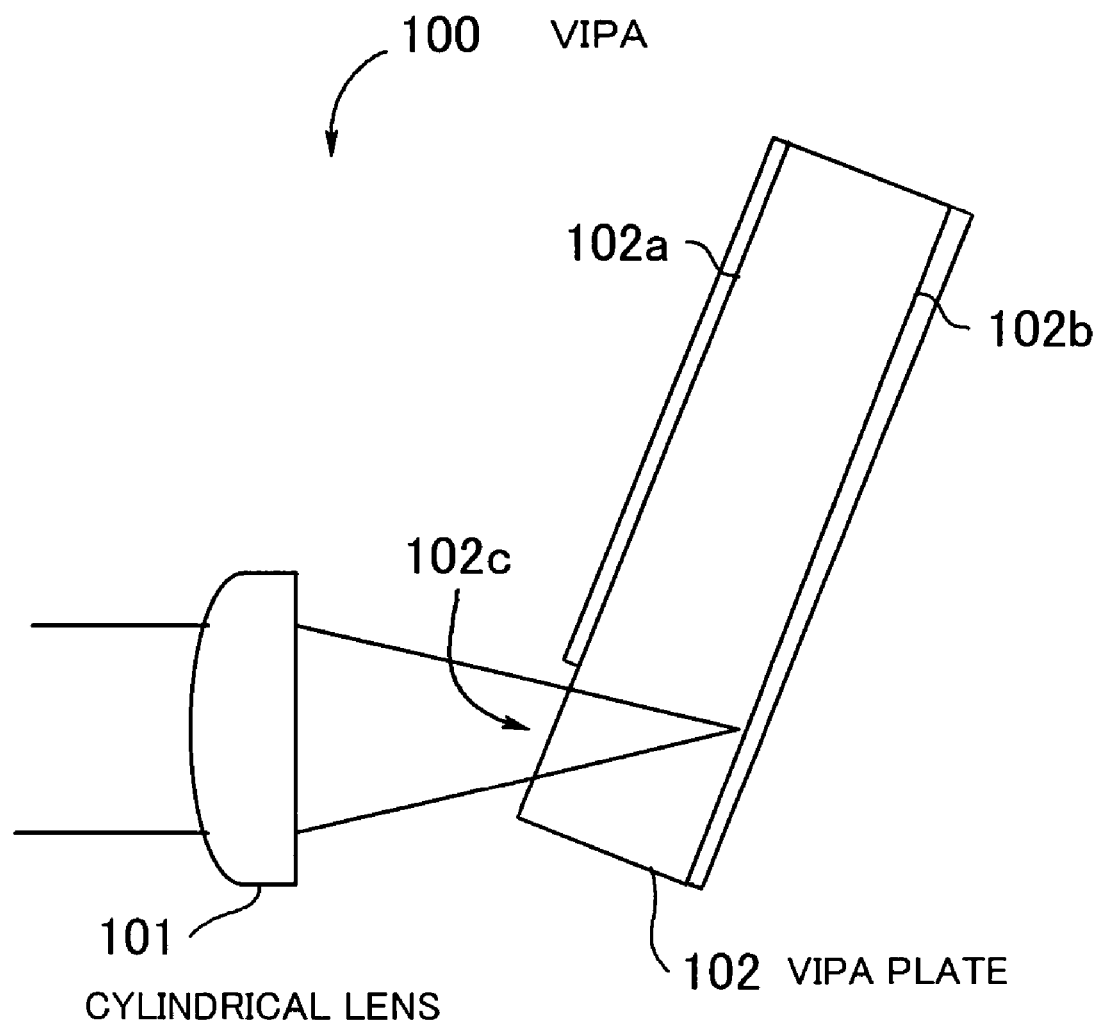
FIG. 2 is a diagram showing the basic construction of a VIPA.

FIG. 2 is a diagram showing the basic construction of the VIPA. The VIPA 100 is comprised of a cylindrical lens 101 and a VIPA plate 102. The cylindrical lens 101 is for collecting the input light. The VIPA plate 102 is a glass plate having a surface 102a coated with a reflection film having a reflectivity of 100% (or a reflection film having a reflectivity close to 100%), a surface 102b coated with a reflection film having a reflectivity of 95 to 98%, and a light incident window 102c.

Figure 3:
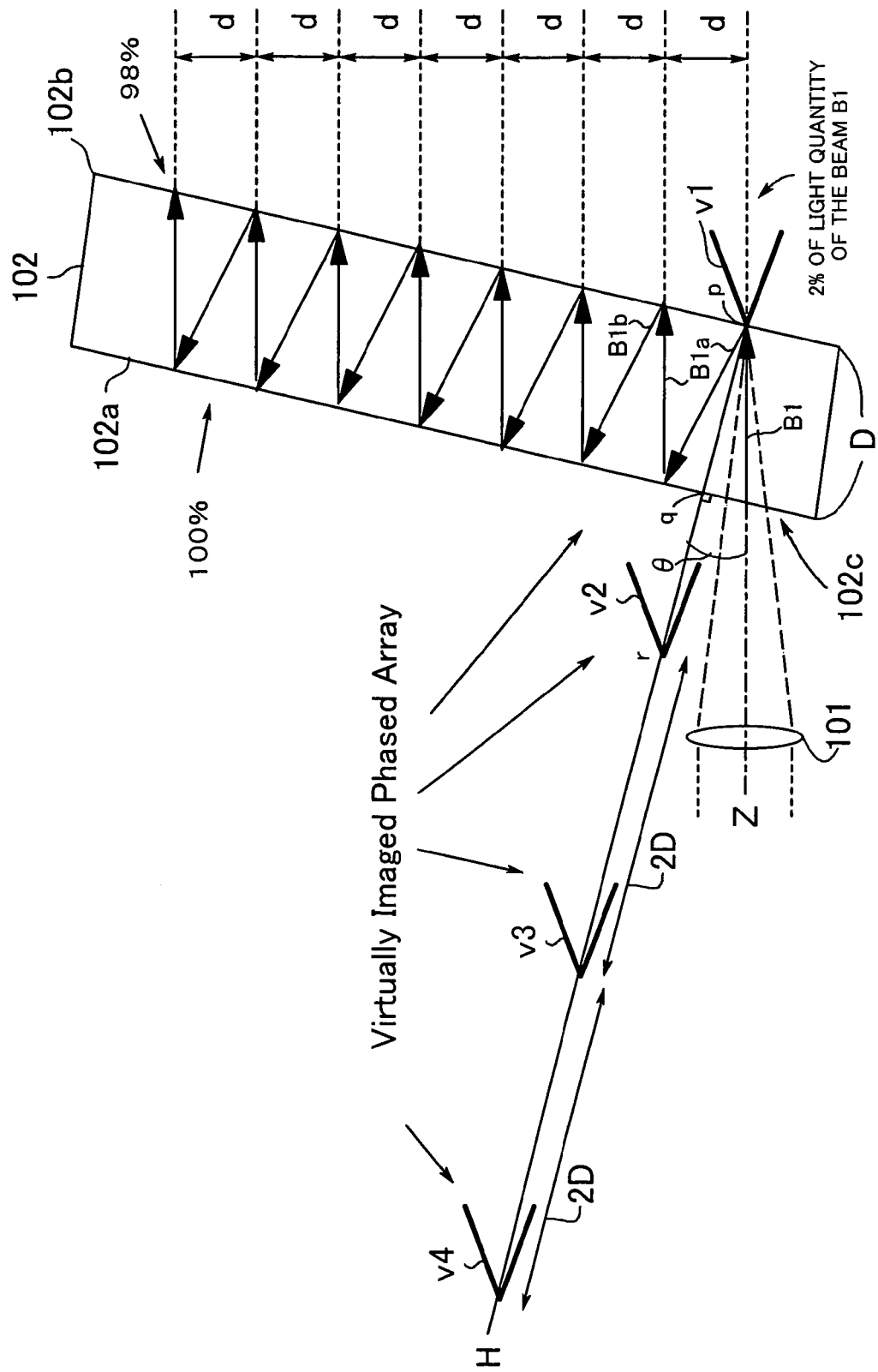
FIG. 3 is a diagram useful in explaining the outline of operation of the VIPA.

FIG. 3 is a diagram useful in explaining the outline of operation of the VIPA. A beam B1 collected by the cylindrical lens 101 enters the VIPA plate 102 via the light incident window 102c. At this time, the optical axis Z of the beam B1 has a small angle $\theta$ of inclination with respect to a normal H to the VIPA plate 102.

Assuming the surface 102a has a reflectivity of 100%, and the surface 102b has a reflectivity of 98%, 2% of the beam B1 is emitted from the surface 102b with a beam diameter corresponding to the thickness of the glass plate (the beam emitted from the surface 102b is a round beam (collimated light beam) with a small expansion angle, and has a beam diameter dependent on the thickness of the glass plate). The remaining 98% of the beam B1, i.e. a beam B1a is reflected toward the surface 102a (beam B1a travels toward the surface 102a while expanding to a small degree dependent on the thickness of the glass plate).

Further, since the surface 102a has a reflectivity of 100%, the beam B1a is totally reflected therefrom toward the surface 102b (beam B1a travels toward the surface 102b while expanding to a small degree dependent on the thickness of the glass plate). Then, 2% of the beam B1a is emitted from the surface 102b with a beam diameter dependent on the thickness of the glass plate. At this time, the position of a spot where the beam B1 emerges and a spot where the beam B1a emerges is displaced by a distance d.

Similarly, the remaining 98% of the beam B1a i.e. a beam B1b is reflected toward the surface 102a. These operations are repeatedly carried out whereby the beam incident on the VIPA plate 102 via the cylindrical lens 101 undergoes multiple reflections within the VIPA plate 102, and small amounts of split beams are sequentially emitted from the surface 102b at fixed spacing intervals of the distance d.

The beams emitted from the surface 102b at the fixed spacing intervals of the distance d can be regarded as beams emitted from virtual emission spots v1 to vn (up to v4 are shown in the illustrated example) arranged in an array of steps (from which comes the name of the VIPA (Virtually Imaged Phased Array). This behavior can be regarded as that of an echelon diffraction grating, and similarly thereto, the incident light is split and emitted as the separate beams.

Assuming that the glass plate of the VIPA plate 102 has a thickness D, the virtual emission spots v1 to vn are arranged along the normal H to the VIPA plate 102 at fixed intervals of 2D. As to the virtual emission points v1 and v2, a line segment pq=a line segment qr=the distance D holds, and therefore, the distance between the positions of the points is equal to 2D along the normal H. The other virtual emission points are also located at intervals of 2D.

Figure 4:
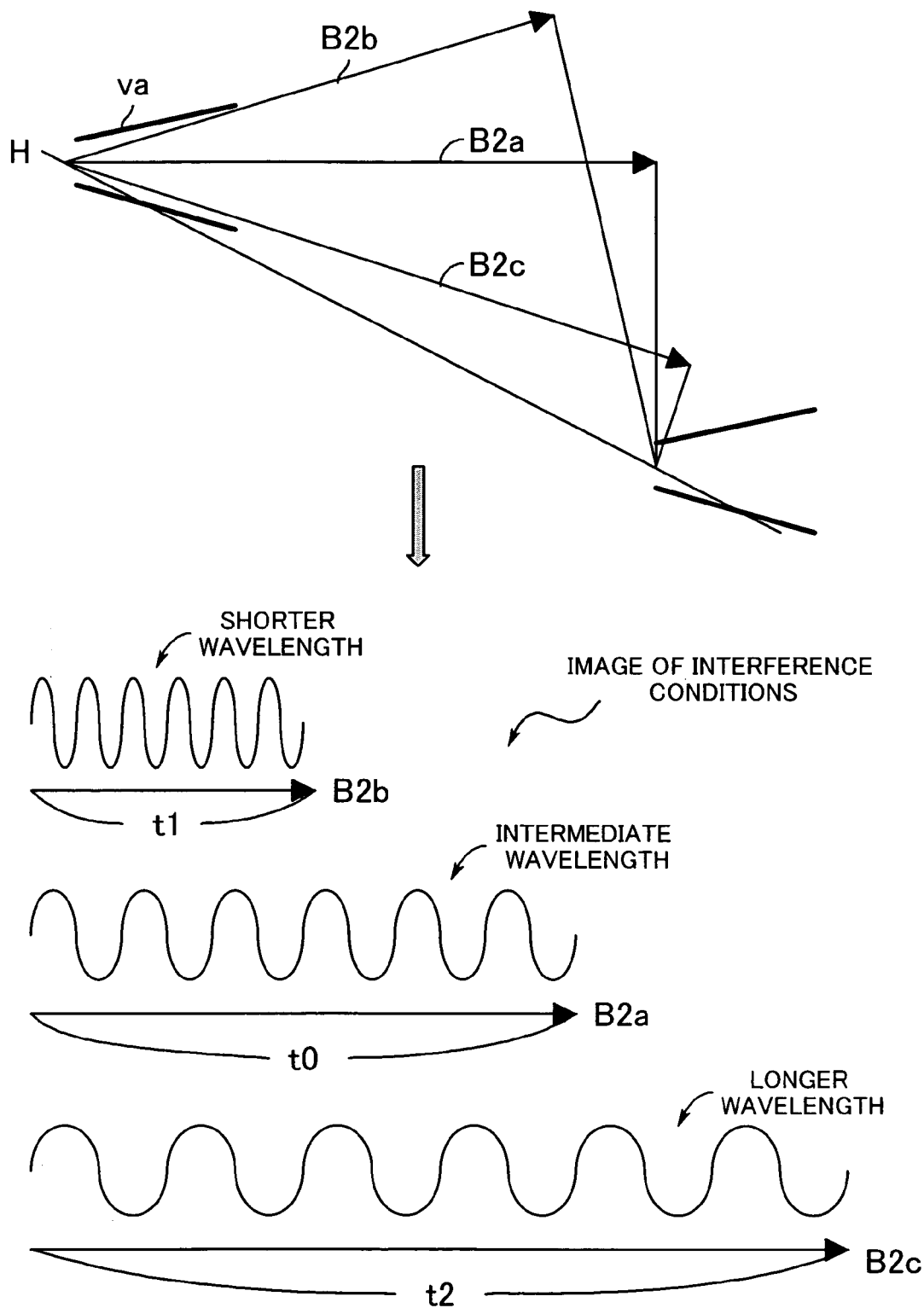
FIG. 4 is a diagram showing interference conditions of the VIPA.

FIG. 4 is a diagram showing interference conditions of the VIPA 100. Of beams emitted from an emission spot va, a beam B2a is assumed to have m wavelength cycles within a path t0 through the VIPA plate along the optical axis (the beam B2a is assumed to have an intermediate wavelength). In this case, when the interference conditions are to be satisfied between the beam B2a and a beam B2b shown above the beam B2a such that the beams B2a and B2b are intensified by each other, since a path t1 (defined as a path which is in phase with the path t0) of the beam B2b is shorter than the path t0, in order for the beam B2b to have m wavelength cycles within the path t1, it is required that the wavelength of the beam B2b is shorter than the wavelength of the beam B2a.

Further, when the interference conditions between the beam B2a and a beam B2c shown below the beam B2a are satisfied such that the beams B2a and B2c are intensified by each other, since a path t2 (defined as a path in phase with the path t0) of the beam B2c is longer than the path t0, in order for the beam B2c to have m wavelength cycles within the path t2, it is required that the wavelength of the beam B2c is longer than the wavelength of the beam B2a.

Therefore, with respect to the beams emitted from the VIPA plate 102, the interference conditions that the beams are intensified by each other are that the upper beams with reference to the optical axis have shorter wavelengths and the lower beams with reference to the same have longer wavelengths, so that the VIPA 102 emits beams having shorter wavelengths on the upper side with respect to the optical axis thereof, and beams having longer wavelengths on the lower side with respect to the optical axis thereof.

Figure 5:
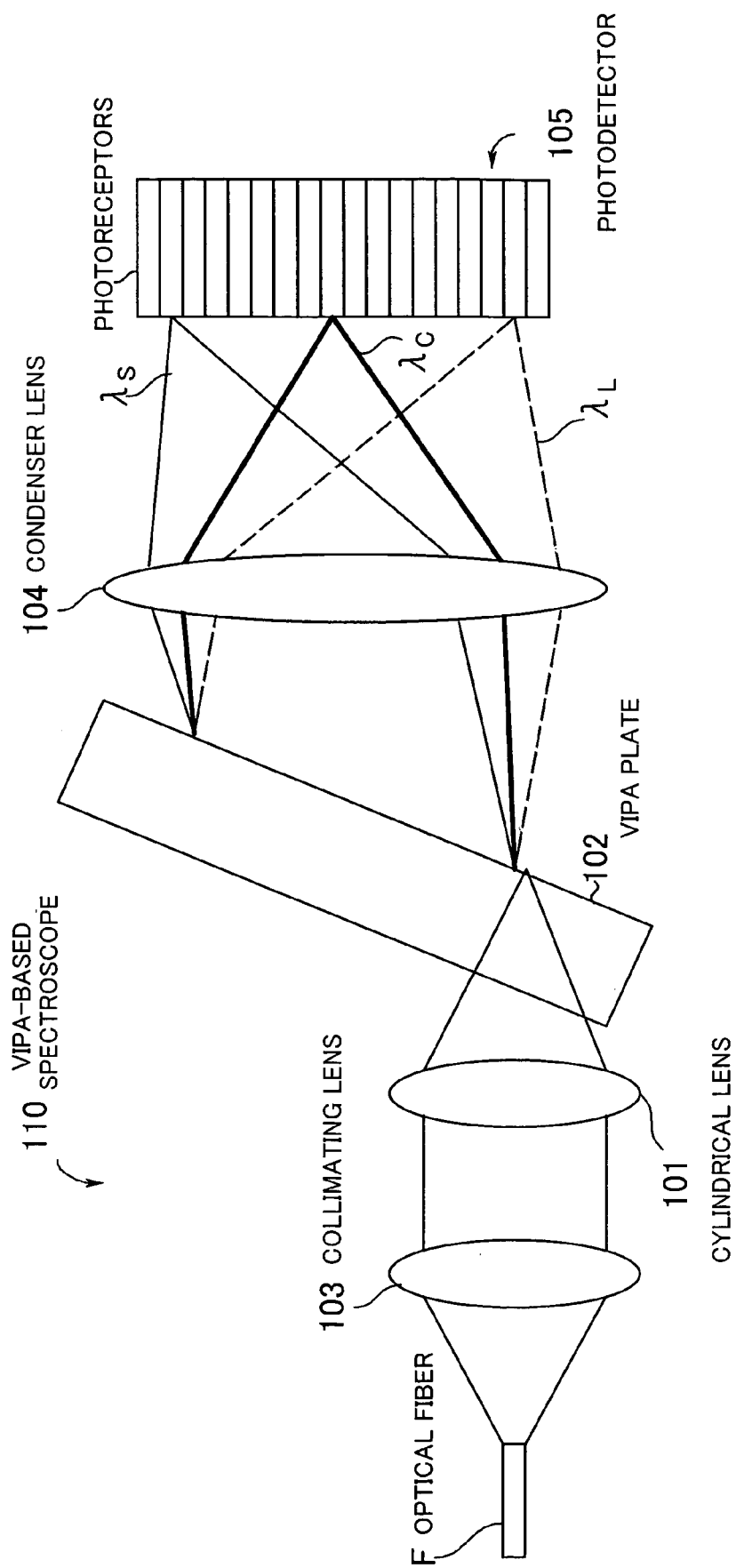
FIG. 5 is a diagram showing a VIPA-based spectroscope.

FIG. 5 is a diagram showing a VIPA-based spectroscope. The VIPA-based spectroscope 110 using the VIPA plate 102 is comprised of an optical fiber F, a collimating lens 103, a cylindrical lens 101, a VIPA plate 102, a condenser lens 104, and a photodetector 105.

The light emitted from the optical fiber F is formed into collimated light by the collimating lens 103, focused by the cylindrical lens 101, and then enters the VIPA plate 102.

The beams split by the VIPA plate 102 are collected by the condenser lens 104. A photodetector 105 comprised of a plurality of photoreceptors is disposed at a location where the beams are collected by condenser lens 104. With the whole arrangement of the above components, the VIPA-based spectroscope 110 can function as the spectroscope. The illustrated example of the photodetector 105 are receiving beams having a shorter wavelength $\lambda S$, an intermediate wavelength $\lambda C$, and a longer wavelength $\lambda L$ within a certain wavelength band.

The VIPA plate 102 has a structure similar to an etalon (i.e. an optical resonator having a structure of two parallel mirrors opposed to each other, for selectively passing only components of light having integral multiples of a predetermined frequency, and blocking the other components), and the diffraction order employed is very large. Further, the slit spacing is determined by an angle of inclination of the VIPA plate 102, which is set to be equal to approximately 1.5° to 4°, so that it is possible to realize very dense slits, which provides a very large diffraction angle.

Therefore, the VIPA-based spectroscope 110 is high in resolution, and the size of the optical system thereof can be reduced, which makes the VIPA-based spectroscope 110 advantageous over the spectroscopes using the diffraction grating, in many respects, and can be effectively applied to various fields. However, when the VIPA-based spectroscope 110 is employed as it is for the apparatus for optical measurement, there are some problems.

Figure 6:
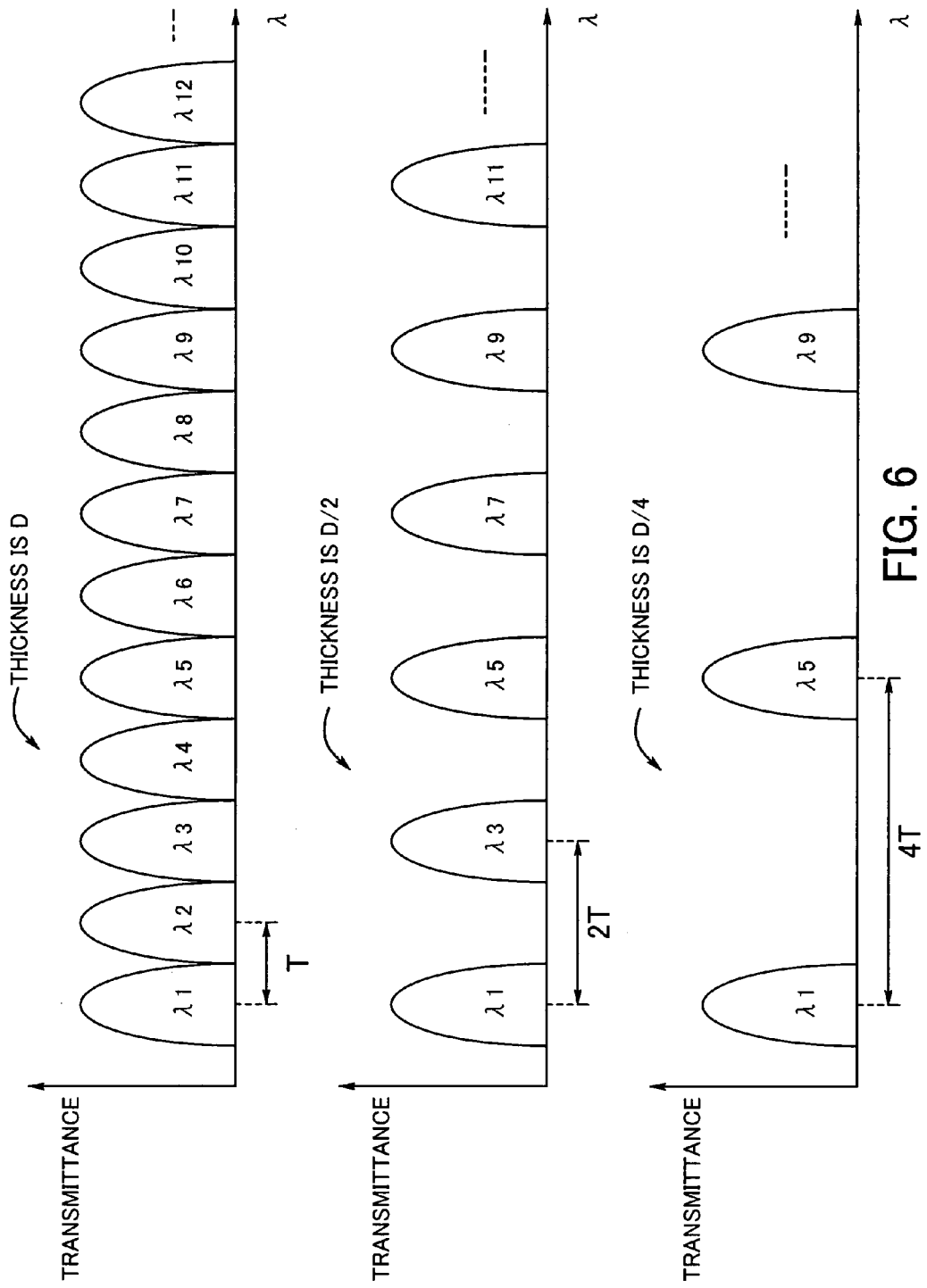
FIG. 6 is a diagram showing a period filter characteristic of a VIPA plate.

Next, the problems in applying the VIPA-based spectroscope 110 to optical measurement will be described. First, the wavelength periodic characteristic of the VIPA plate 102 will be described. FIG. 6 is a diagram showing a period filter characteristic of the VIPA plate 102. The vertical axis represents transmittance and the horizontal axis represents wavelength. When a wide band of light (white light) is incident on the VIPA plate 102, beams emerging from the VIPA plate 102 show a wavelength periodicity that beams having wavelengths $\lambda 1, \lambda 2, \lambda 3, \ldots$ pass and are emitted (such filtering characteristics are exhibited by optics, such as the VIPA plate and the etalon, which have reflection films provided on the front and reverse surfaces thereof with a predetermined thickness, for multiple reflections so as to cause internal interferences of the reflected beams).

Now, the optical length of the light traveling within the VIPA plate 102 is proportional to the refractive index n of the glass plate of the VIPA plate 102 and the thickness D of the glass plate (optical length $\propto n \times D$) and a wavelength period T depends on the optical length.

For example, if the refractive index n is fixed, and the thickness is reduced to half (D/2), the wavelength period is increased to 2T, so that from the VIPA plate 102, beams having wavelengths $\lambda 1, \lambda 3, \lambda 5, \ldots$, are emitted. Further, if the refractive index n is fixed, and the thickness is reduced to D/4, the wavelength period is increased to 4T, so that beams having wavelengths $\lambda 1, \lambda 5, \lambda 9 \ldots$, are emitted.

As described above, the VIPA plate 102 functions as a period filter, and the light emitted from the VIPA plate 102 has a wavelength periodicity. This is a drawback of the VIPA-based spectroscope 110 when it is used as a device for optical measurement.

Figure 7:
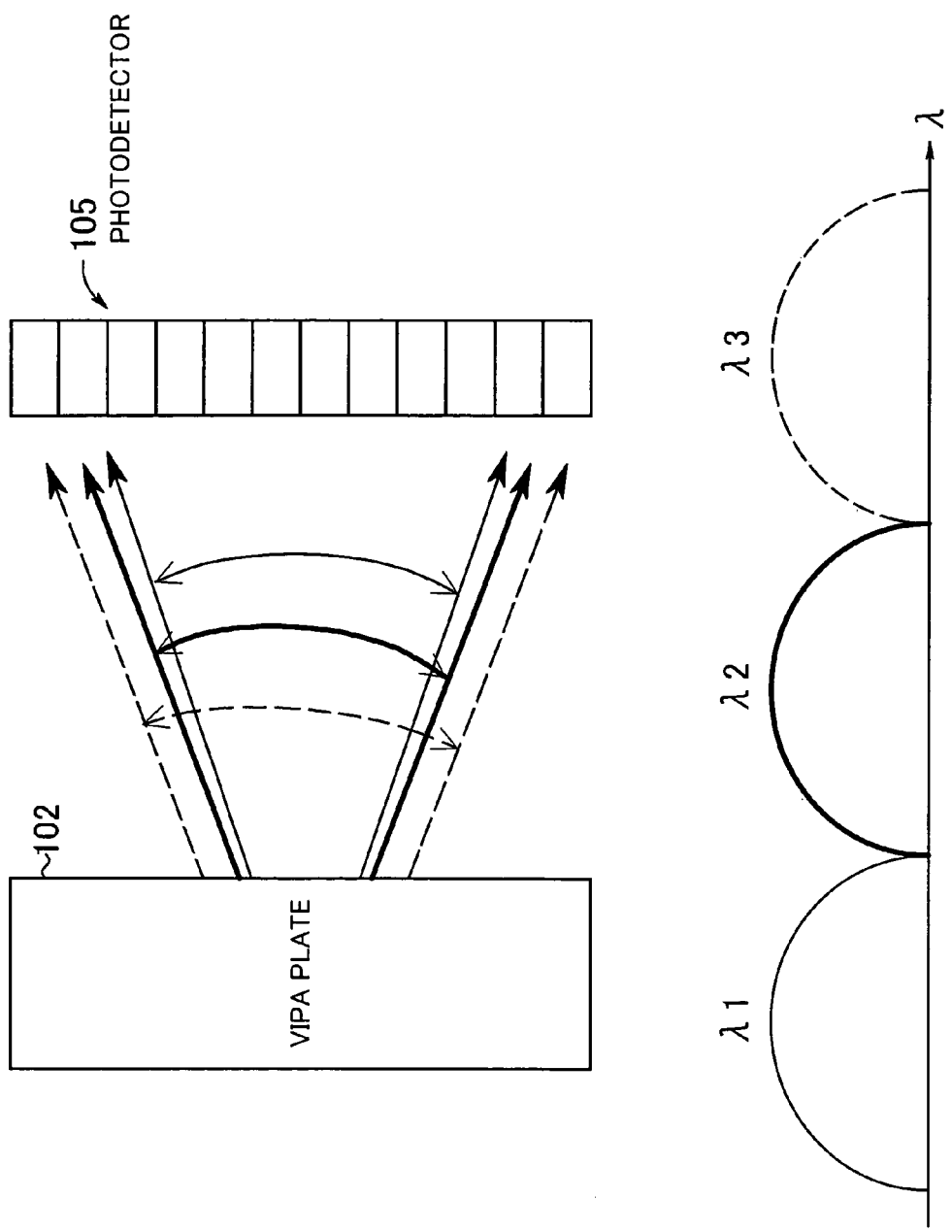
FIG. 7 is a diagram showing the relationship between light-splitting directions and periodicity.

FIG. 7 is a diagram showing the relationship between light-splitting directions and periodicity. Illustration of lenses and other elements are omitted. To show the features of the period filter of the VIPA plate 102, the illustrated example shows a state of receiving light components of beams in wavelength bands λ1, λ2, and λ3. The photoreceptors constituting the photodetector 105 of the VIPA-based spectroscope 110 receive a light component of each of the wavelength bands λ1 to λ3 at an identical position in respect of period.

Figure 8:
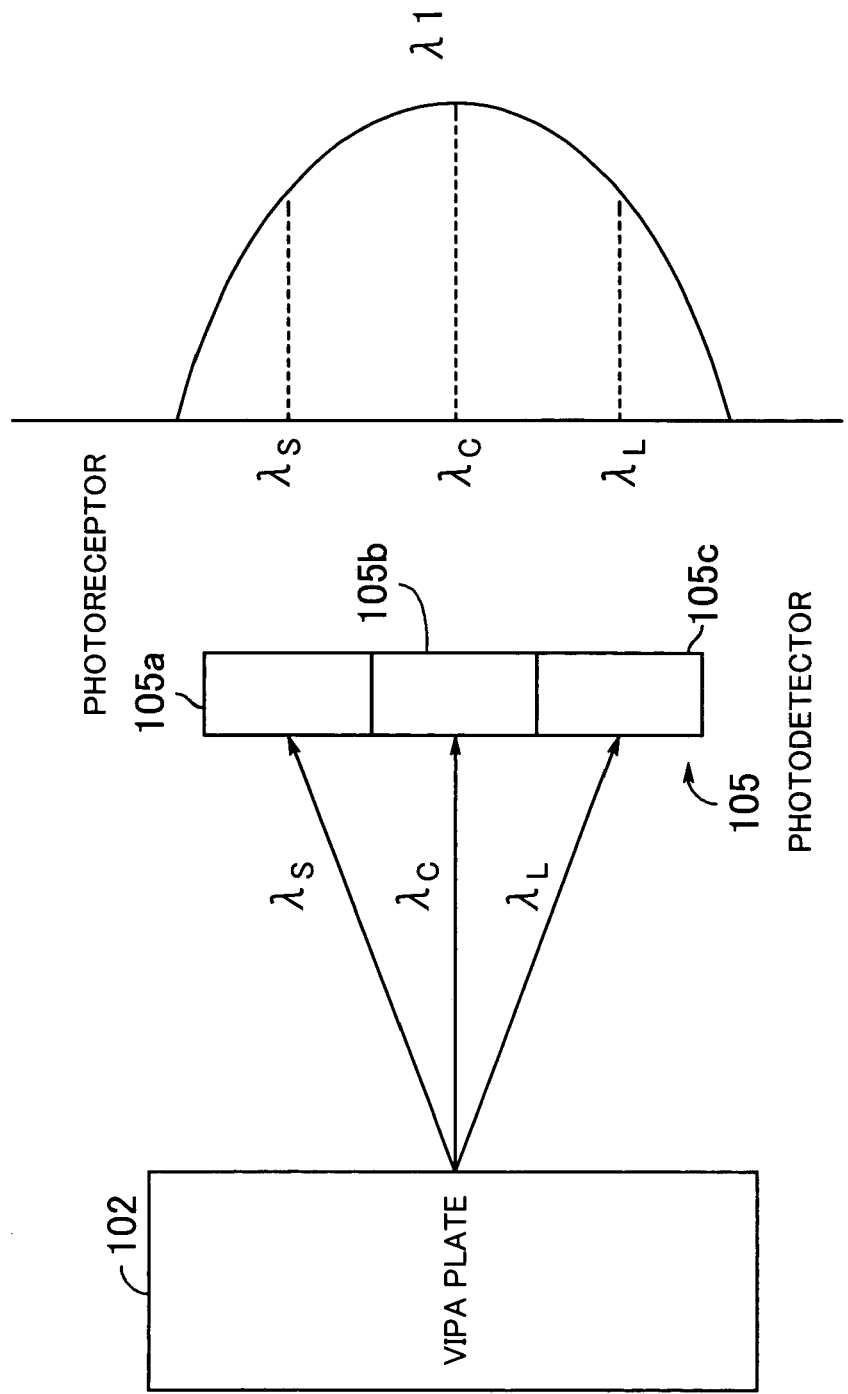
FIG. 8 is a diagram showing a conceptual representation of splitting of a single wavelength band.

FIG. 8 is a diagram showing a conceptual representation of light splitting, i.e. a state where beams formed by splitting a beam in one wavelength band λ1 are emitted and received by the photodetector. It is assumed here, for simplicity, that the photodetector 105 is formed by three photoreceptors 105a to 105c. The VIPA plate 102 splits a beam in one wavelength band λ1, and emits beams having e.g. a shorter wavelength λS, an intermediate wavelength λC, and a longer wavelength λL. The photoreceptor 105a, 105b and 105c receive the shorter wavelength λS, the intermediate wavelength λC and the longer wavelength λL, respectively.

Figure 9:
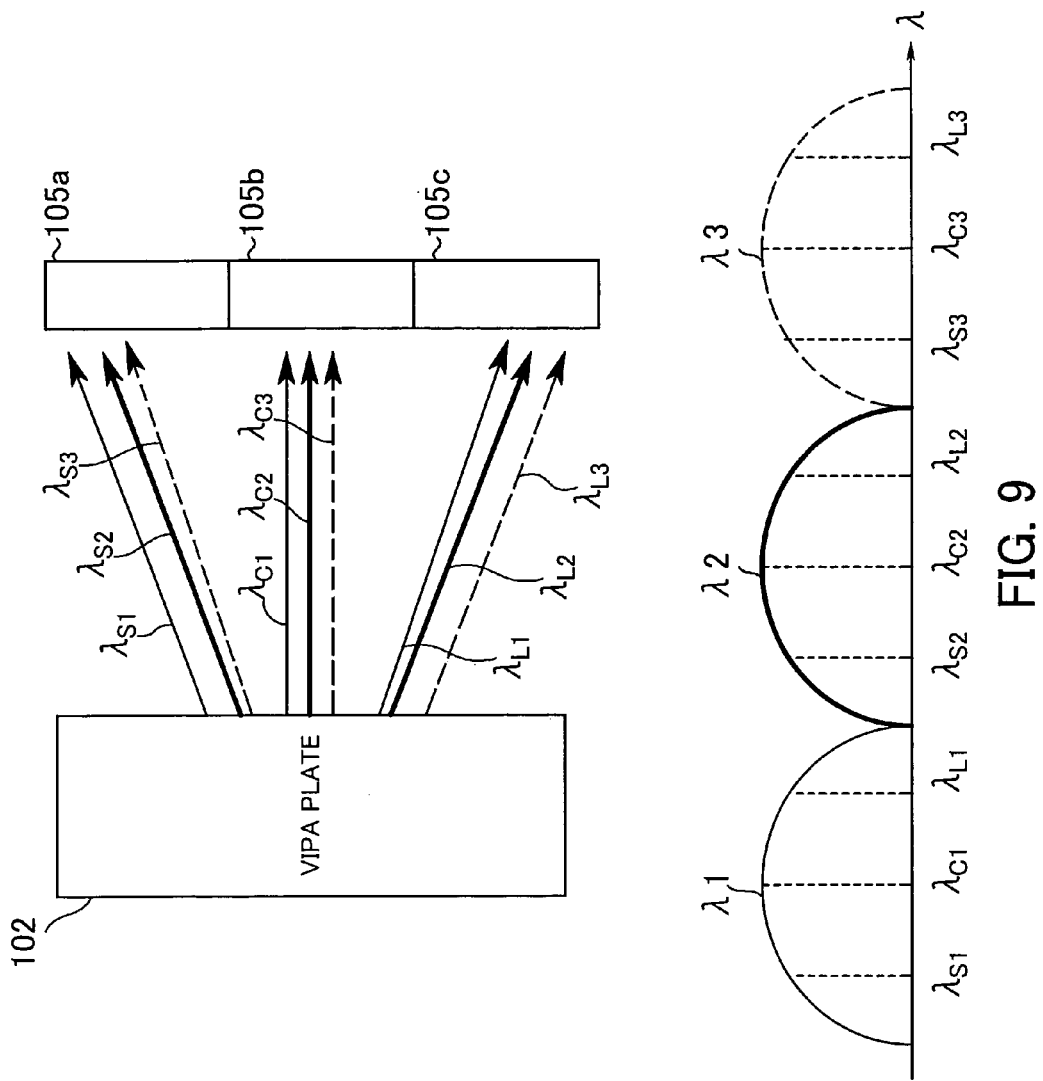
FIG. 9 is a diagram showing a conceptual representation of splitting of a plurality of wavelength bands.

FIG. 9 is a drawing showing another conceptual representation of light splitting, in which beams formed by splitting beams in wavelength bands λ1, λ2, and λ3, are being received. For example, the photoreceptor 105a receives beams having shorter wavelengths λS1 to λS3 within the wavelength bands λ1 to λ3, the photoreceptor 105b receives beams having intermediate wavelengths λC1 to λC3 within the wavelength bands λ1 to λ3, and the photoreceptor 105c receives beams having longer wavelengths λL1 to λL3 within the wavelength bands λ1 to λ3.

As described above, in the VIPA-based spectroscope 110, the VIPA plate 102 is a period filter, and the beams emitted therefrom have a wavelength periodicity. Therefore, when the VIPA plate 102 splits and filters beams of light incident thereon, which have wavelengths λ1 to λn, one of the photoreceptors constituting the photodetector 105 receives a plurality of light components within the wavelength bands λ1 to λn, respectively, at an identical position in respect of period, as shown in FIG. 9 (e.g. the photoreceptor 105a receives beams having the shorter wavelengths λS1 to λS3 of λ1 to λ3).

In the VIPA-based spectroscope 110 operating as described above, one photoreceptor of the photodetector 105 receives light components at the same position within each period which are obtained by splitting beams of all wavelengths (channels). Therefore, when the VIPA-based spectroscope 110 is used in a WDM receiver or the like, as a device for optical communications, it has the advantage of being capable of collectively processing a plurality of channels.

However, in the spectroscopic apparatus for optical measurement, it is desired to observe only light components obtained by splitting a beam having one wavelength (band), and therefore, the VIPA-based spectroscope 110, which inputs a plurality of light components within each wavelength band to each photoreceptor, cannot be used as it is, for a spectroscope for optical measurement.

To make the VIPA-based spectroscope 110 applicable to the spectroscopic apparatus for optical measurement, it is only required to eliminate the cause of making the same a period filter, to thereby enable the photodetector to receive beams without wavelength periodicity. The present invention provides, through application of the VIPA-based spectroscope 110, a high-precision spectroscopic apparatus which is compact in size with a large angular dispersion, and can be used for optical measurement in general.

Next, details of the present invention will be described. FIG. 10 is a diagram useful in explaining the function of the bandpass filter 13. The bandpass filter 13 extracts one wavelength band at one period, and allows the same to pass. For example, in the illustrated example, only a beam in a wavelength band λ5 is extracted from light ranging from a wavelength band λ1 to a wavelength band λn and allowed to pass.

Figure 11:
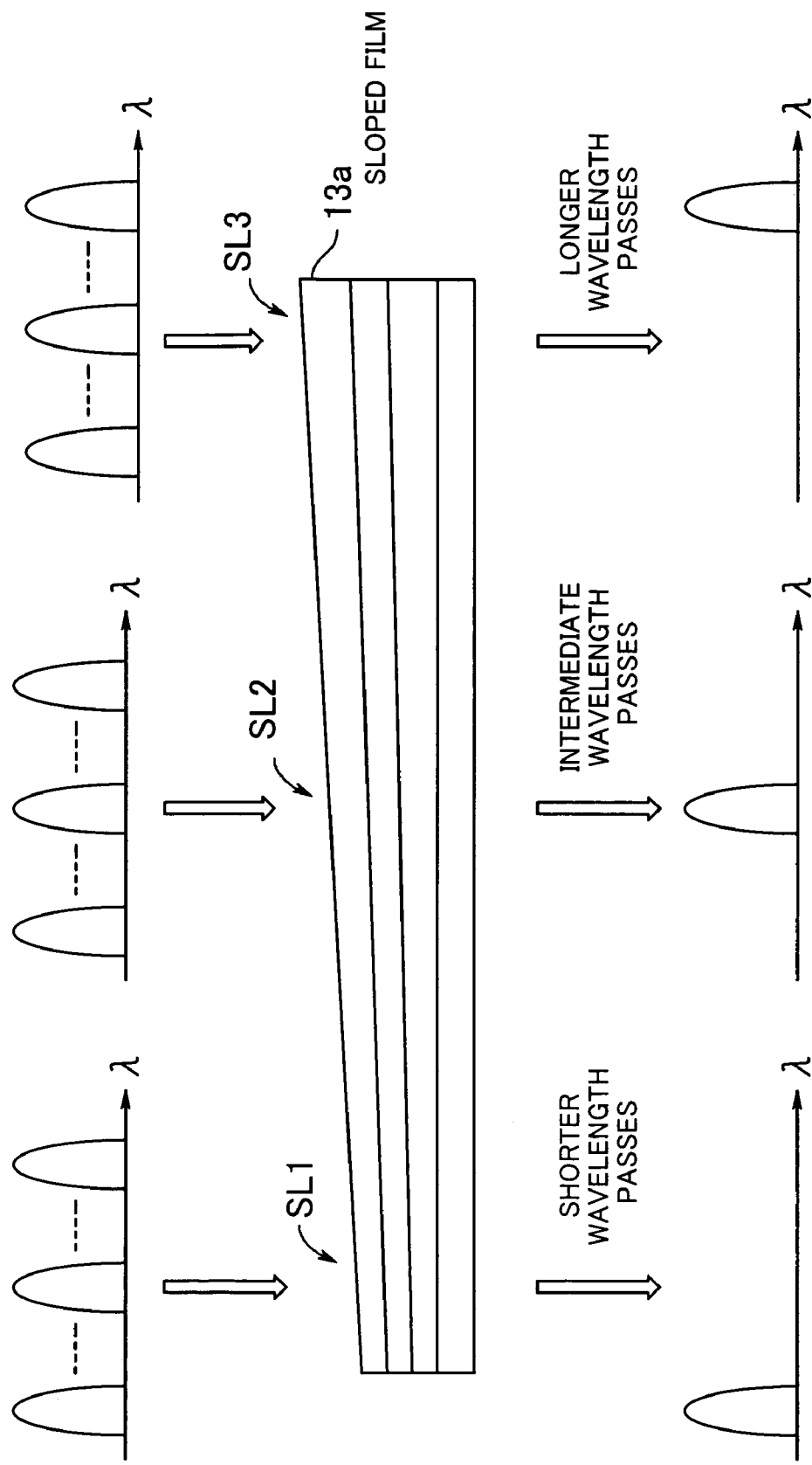
FIG. 11 is a diagram showing the construction of a bandpass filter and a state where wavelengths pass therethrough.

FIG. 11 is a diagram showing the construction of the bandpass filter 13 and a state where wavelengths pass therethrough. The bandpass filter 13 is implemented by a sloped film 13a formed by sequentially depositing multiple films of a dielectric material each having a varying thickness such that the resulting multi-layered film is sloped. The wavelength bands of beams passing through the film 13a are different depending on the location of the slope where the light is incident. When light is incident on a slope location SL1 where the film has a smaller thickness, a beam having a shorter wavelength passes. When the light is incident on a slope location SL2 where the film has an intermediate thickness, a beam having an intermediate wavelength passes. When the light is incident on a slope location SL3 where the film has a larger thickness, a beam having a longer wavelength passes.

Figure 12:
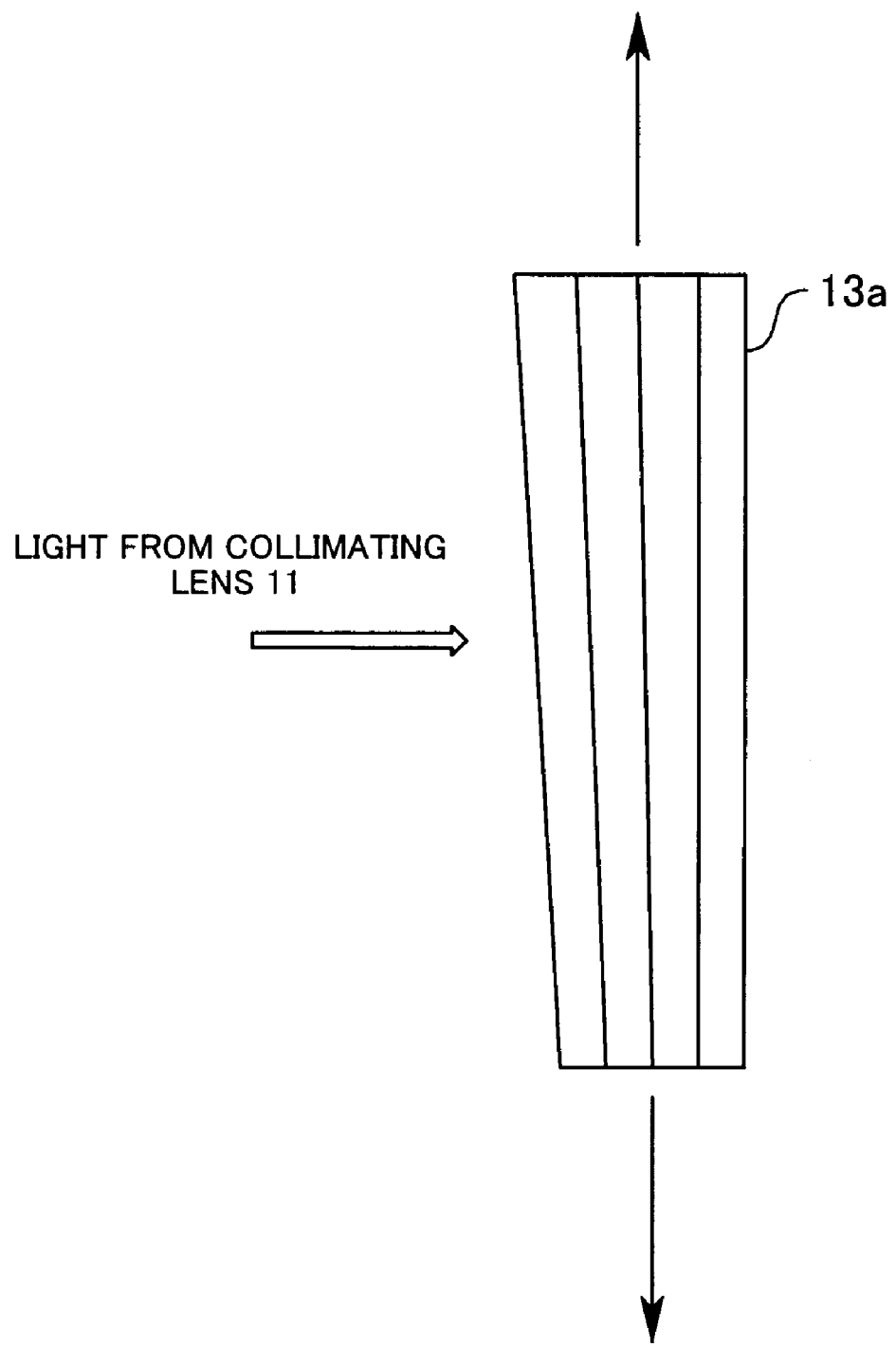
FIG. 12 is a diagram illustrating moving control of a sloped film.

FIG. 12 is a diagram showing a moving control of the sloped film 13a. The sloped film 13a is configured such that it can be vertically moved in directions indicated by arrows in FIG. 12, to change the slope location where the light from the collimating lens 11 is incident, whereby it is possible to select and pass a beam having a desired wavelength (band). In this case, the sloped film 13a is equipped with a motor, and the motor is driven by a filtering characteristic-selecting signal from a control section 40, whereby the sloped film 13a is moved to a position where a beam in a predetermined wavelength band can be passed.

In addition to the motor, a micrometer may be further provided, to enable fine adjustment of a vertical position of the sloped film 13a. Further, it is also possible to perform the fine adjustment of a wavelength band allowed to pass by adjusting not only the vertical position but also the inclination of the sloped film 13a with respect to the optical axis of light form the collimating lens 11.

Figure 13:
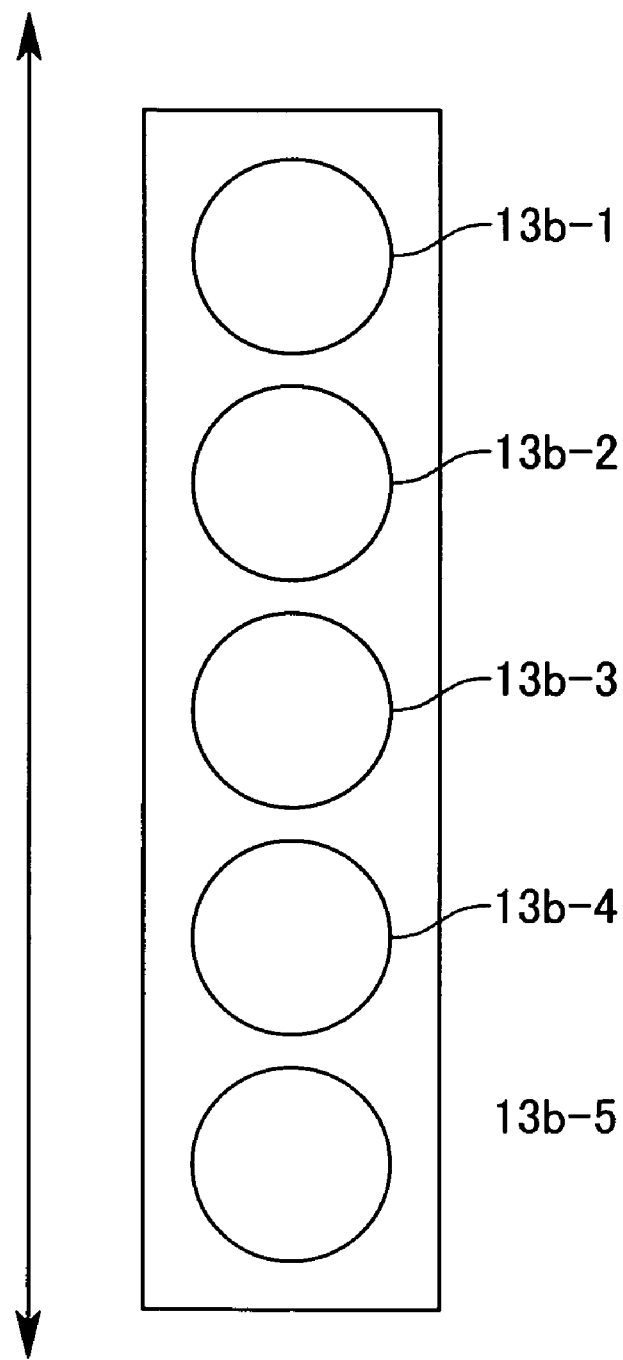
FIG. 13 is a diagram showing a variation of the bandpass filter.
Figure 14:
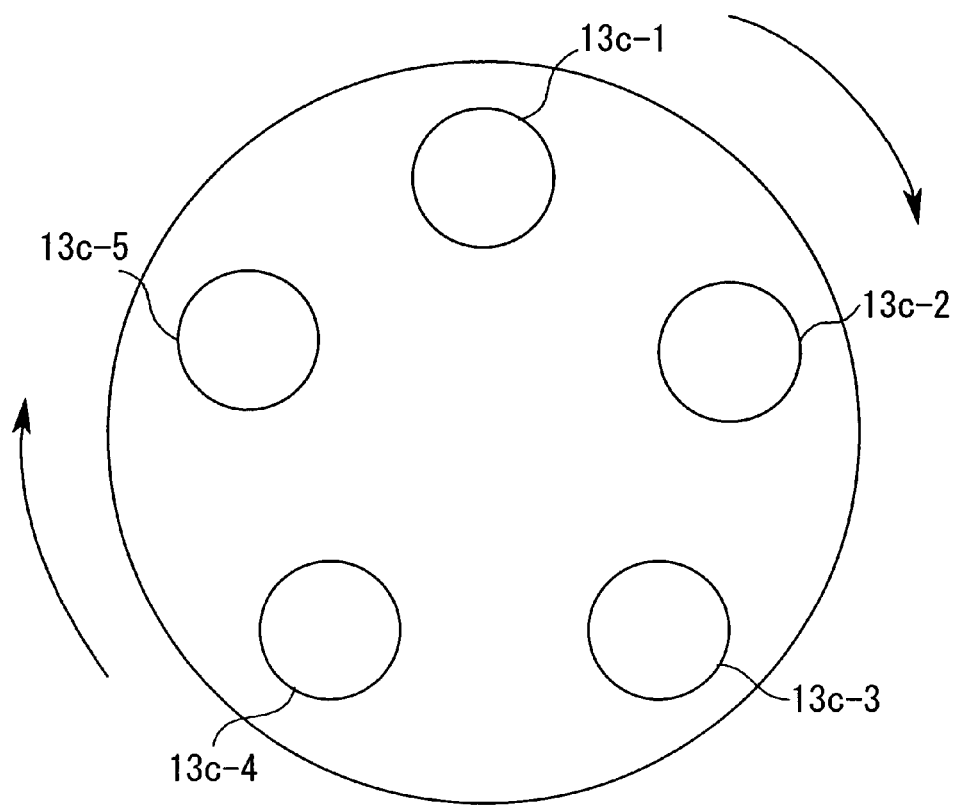
FIG. 14 is a diagram showing another variation of the bandpass filter.

FIGS. 13 and 14 are diagrams showing variations of the bandpass filter 13. As alternatives to the configuration of the sloped film 13a described above, the bandpass filter 13 may be configured such that a plurality of filters are disposed in an array for selection so as to pass one of beams having different wavelengths which can be passed by the filters, respectively.

The filter array shown in FIG. 13 is a linear array of filters 13b-1 to 13b-5, and the array can be vertically moved in directions indicated by arrows by a control signal from the control section 40, thereby making it possible to select a predetermined wavelength (band) allowed to pass.

The filter array shown in FIG. 14 is a circular array of filters 13c-1 to 13c-5, and the array can be rotated in directions indicated by arrows by a control signal from the control section 40, thereby making it possible to select a predetermined wavelength (band) allowed to pass.

Although the control of selection of a wavelength (band) allowed to pass by the bandpass filter is described above with reference to FIGS. 10 to 14, with this additional configuration alone, there is a fear that adjacent wavelength components may leak into the wavelength band allowed to pass.

Figure 15:
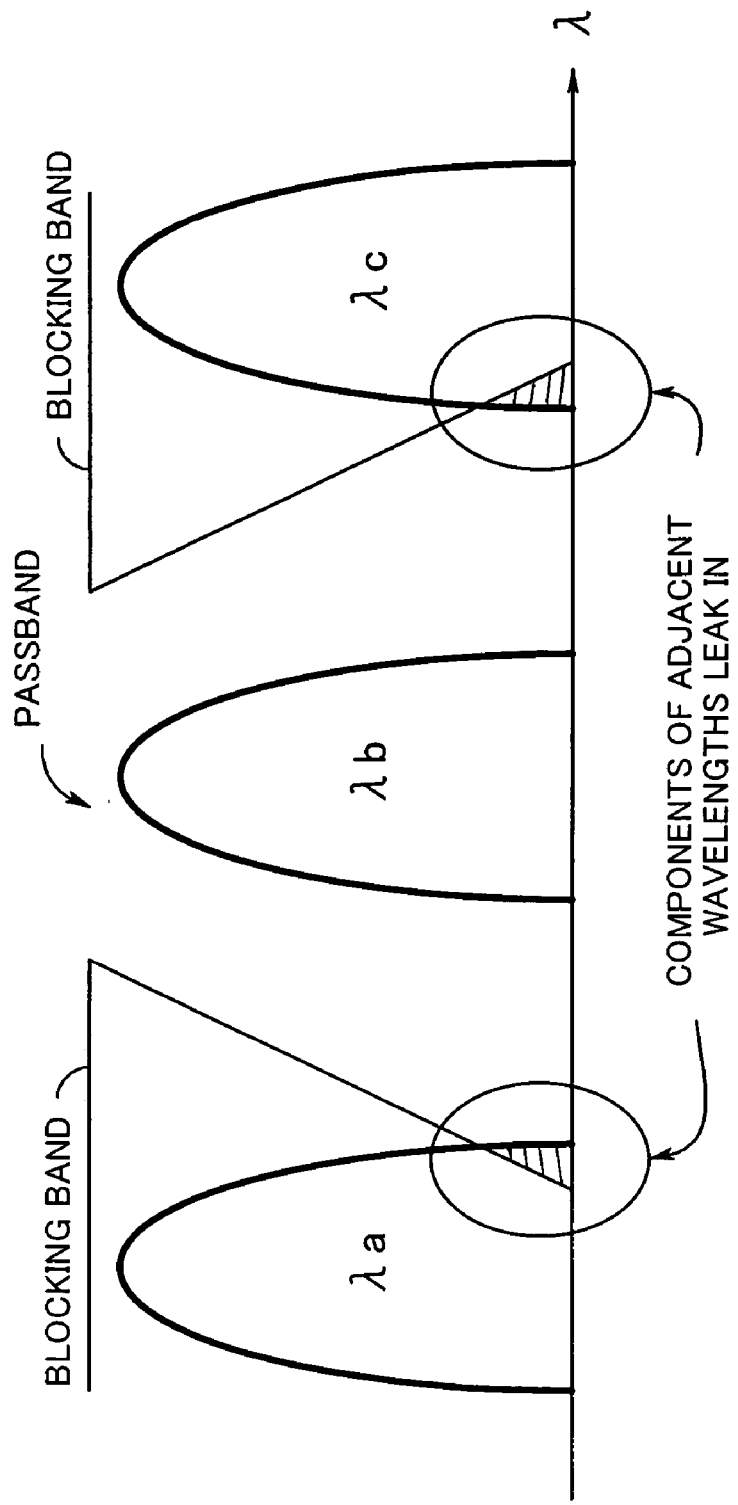
FIG. 15 is a diagram showing a status of passage of one wavelength band.

FIG. 15 is a diagram showing a status of passage of one wavelength band. The transmission characteristic of the bandpass filter 13 is ideally rectangular, but in actuality, they are not rectangular but sloped to form a trapezoidal shape as can be resumed from FIG. 15. Further, the shape of the wavelength band has a mountain shape, so that when the filtering-out of a wavelength band λb is carried out by the bandpass filter 13, there is a fear of end portions of wavelength bands λa or λc leaking into the passband. Therefore, it is necessary to change the interference conditions through control of the optical length through the VIPA plate 20, whereby the amount of leakage is controlled to be within a tolerance.

Figure 16:
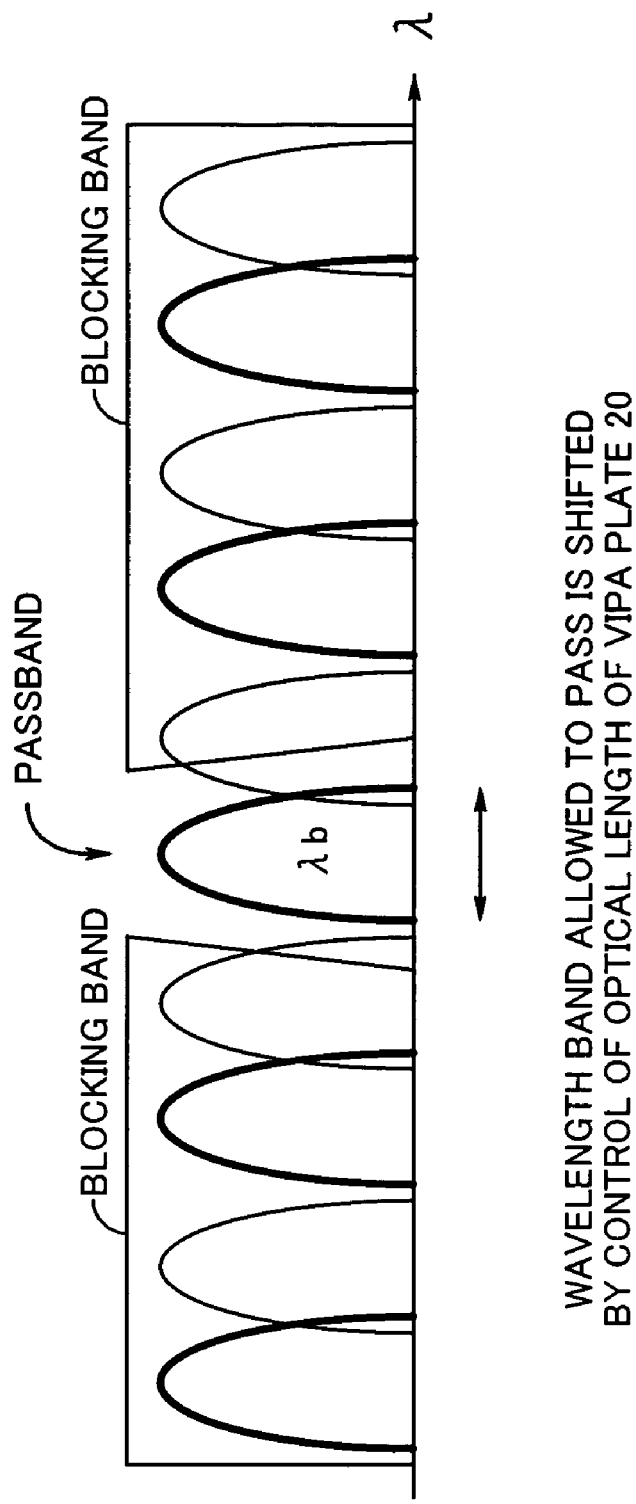
FIG. 16 is a diagram showing a manner of shifting periodic wavelengths by optical length control.

FIG. 16 is a diagram showing a manner of shifting periodic wavelengths by optical length control. By changing the optical length through the VIPA plate 20, the wavelength transmission characteristic is shifted in a leftward or rightward as viewed in FIG. 16 (waveform of thin solid lines conceptually represents wavelength bands shifted in period). Through this control, it is possible to control the amount of leakage of components of adjacent wavelength bands into the predetermined wavelength band allowed to pass λb (control the amount of leakage within a predetermined tolerance).

Next, a description will be given of the optical length control of the VIPA plate 20. The optical length control can be carried out by making use of temperature or electric field. First, the optical length control using temperature will be described.

Figure 17:
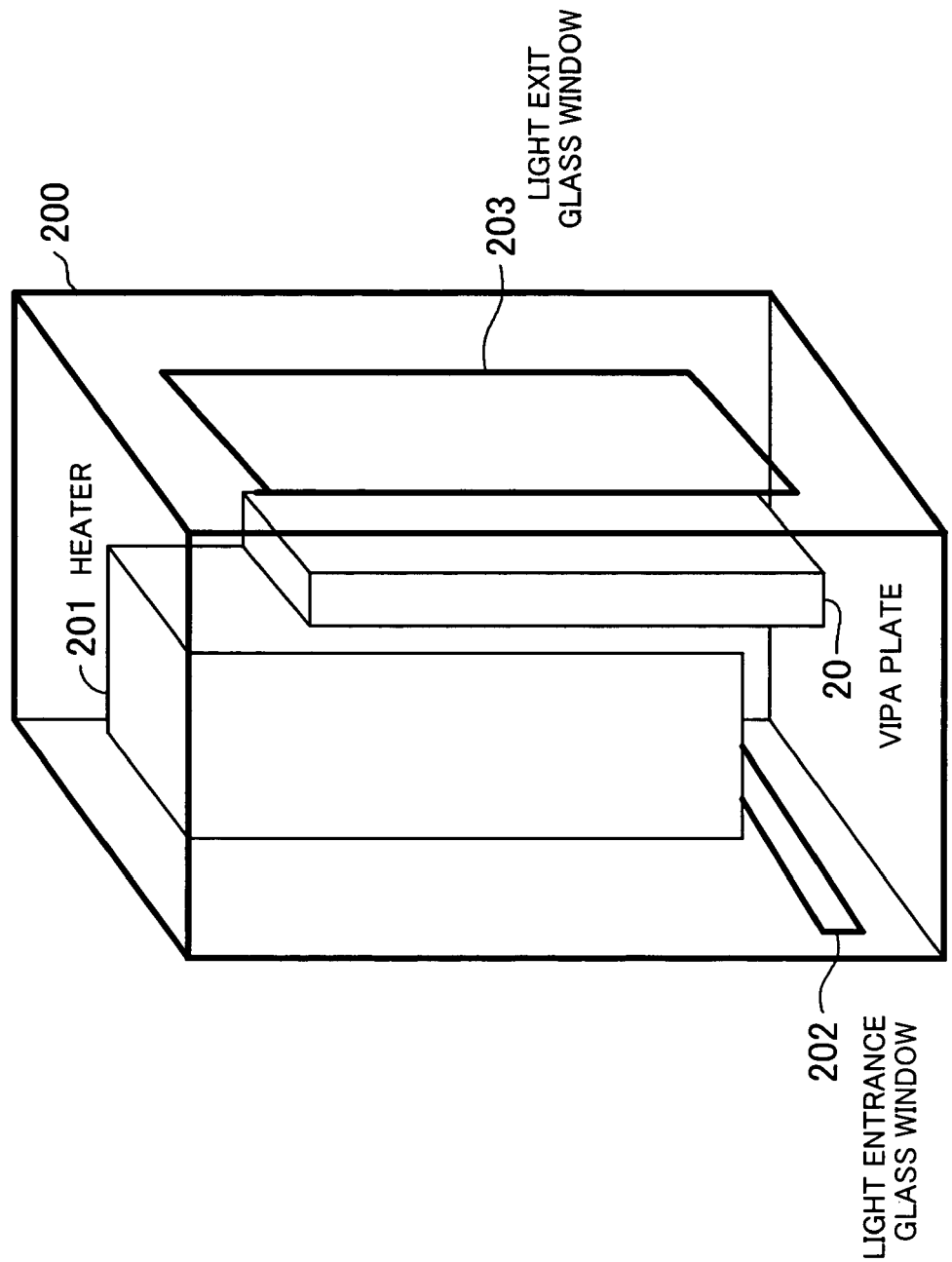
FIG. 17 is a diagram showing a construction that changes the optical length through the VIPA plate by utilizing temperature.

FIG. 17 is a view showing a construction that changes the optical length through the VIPA plate 20. A container 200 includes a VIPA plate 20 and a heater 201, and glass windows 202 and 203 are formed at a light entrance and a light exit, respectively. The container 200 is formed as a thermostatic bath within which the VIPA plate 20 is gastightly sealed. Further the heater 201 is implemented e.g. by a Peltier device, and the temperature thereof is controlled by a control signal from the control section 40 to thereby uniformly control the temperature of VIPA plate 20.

The temperature-controlled VIPA plate 20 undergoes changes in the thickness D and refractive index n according to the coefficient of linear expansion (=α) and the temperature coefficient of the refractive index (=dα/dt) which are dependent on the material of a substrate thereof. Assuming that the thickness of the glass substrate at a reference temperature is represented by d0, and a temperature difference between a controlled temperature and the reference temperature is represented by Δt, the thickness D is changed according to the following equation (1):

$$D = d0(1 + \alpha \Delta t) \quad (1)$$

Further, assuming that the refractive index at the reference temperature is represented by n0, the refractive index n is changed according to the following equation (2):

$$n = n0 + \frac{dn}{dt}\Delta t \quad (2)$$

The product of multiplication of the equations (1) and (2) gives the optical length when the temperature rises by Δt from the reference temperature, so that beams satisfying the interference conditions at this time are emitted from the VIPA plate 20. The temperature control thus performed enables the optical length through the VIPA plate 20 to be changed. It should be noted that temperature control devices other than the Peltier device may be used for the heater 201.

Next, the optical length control using electric field will be described. In place of the temperature control described above, the VIPA plate 20 can be configured such that it is made using a material having a large electrooptic effect, and the refractive index n of the substrate is changed by applying electric field thereto, to thereby control the optical length through the VIPA plate 20. For example, a PLZT-based material PLZT($Pb_{1-x}La_x(Zr_yTi_{1-y})_{1-x/4}O_3$), 0<x<0.28, 0<y<1.0, which is a ferroelectric material, satisfies the above conditions, and can be used in the present invention.

Figure 18:
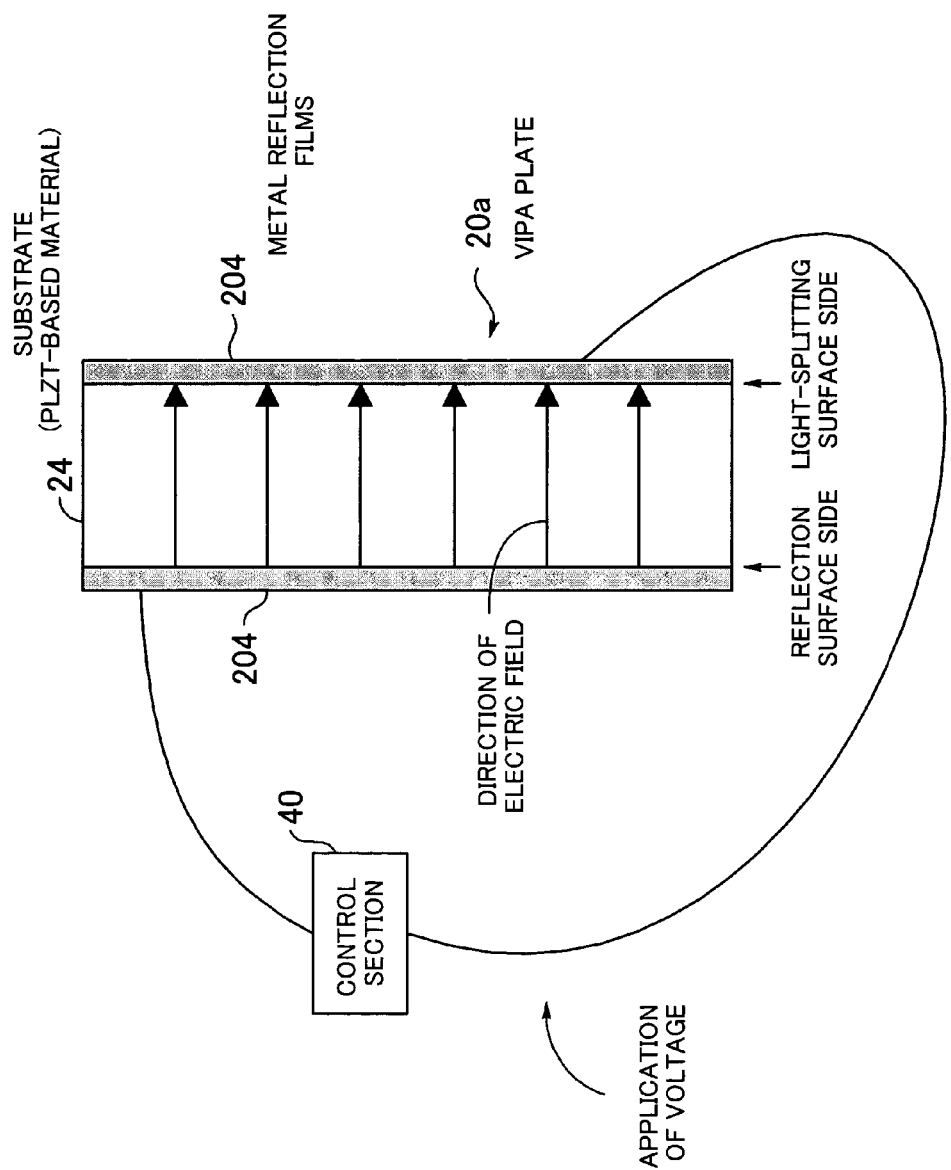
FIG. 18 is a diagram showing a construction that changes the optical length through the VIPA plate by utilizing an electric field.

FIG. 18 is a diagram showing a construction that changes the optical length through the VIPA plate 20 by using the electric field. On a substrate 24 of the VIPA plate, electrically-conductive metal reflection films 204 of gold (Au) are coated on the reflection surface side and the light-splitting surface side thereof, to form the VIPA plate 20a.

Then, the metal reflection films 204 are caused to play the role of electrodes (the metal reflection films 204 are used as reflection film electrodes), and voltage is applied thereto under the control of the control section 40 to apply electric field to the VIPA plate 20a. This makes it possible to cause a change in the refractive index proportional to the strength of electric field, which makes it possible to change the optical length through the VIPA plate 20a.

It should be noted that to effectively apply electric field to the VIPA plate 20a, it is effective to mount metal reflection films 204 on the large areas of the reflection surface and the light-splitting surface of the substrate 24. Further, since electric field is applied substantially in parallel with the direction of travel of light, the influence of bias dependence during application of electric field can be reduced.

Figure 19:
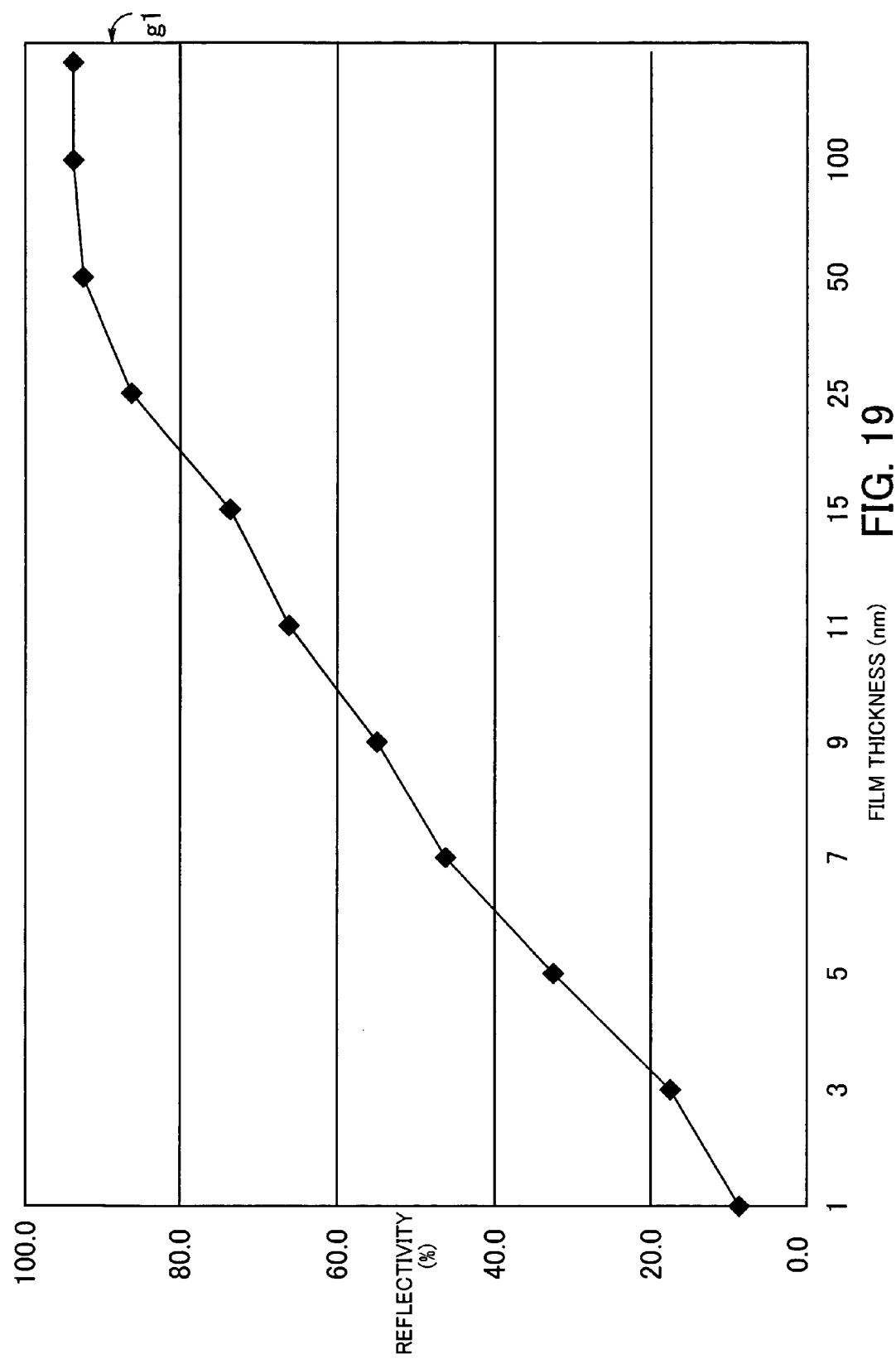
FIG. 19 is a graph showing the relationship between reflectivity and the film thickness of a gold film.

Here, a description will be given of the relationship between the reflectivity of the gold film coated on the VIPA plate 20a and the thickness of the gold film. FIG. 19 is a graph g1 showing the relationship between the reflectivity of the gold film and the film thickness. The vertical axis of the graph g1 represents reflectivity (%) and the horizontal axis of the same represents a film thickness (nm). FIG. 20 shows a table T1 showing the relationship between the reflectivity of the gold film and the film thickness. From the graph g1 and the table T1, it can be understood that when the thickness of the gold film becomes equal to or larger than 70 nm, the reflectivity of the film hardly changes.

In view of this, a gold film having a thickness of 70 nm or larger is coated on the reflection surface side, and a gold film having a thickness of less than 70 nm is coated on the light-splitting surface side to thereby make the opposite sides asymmetric in respect of reflectivity, thereby realizing the control described above with reference to FIG. 18 (without providing a film having a reflectivity close to 100% on the reflection surface, by making both the reflection surface and the light-splitting surface high in reflectivity, and making the reflectivity of the reflection surface higher than that of the light-splitting surface, it is possible to sufficiently realize the function of the VIPA plate in a practical sense).

Figure 21:
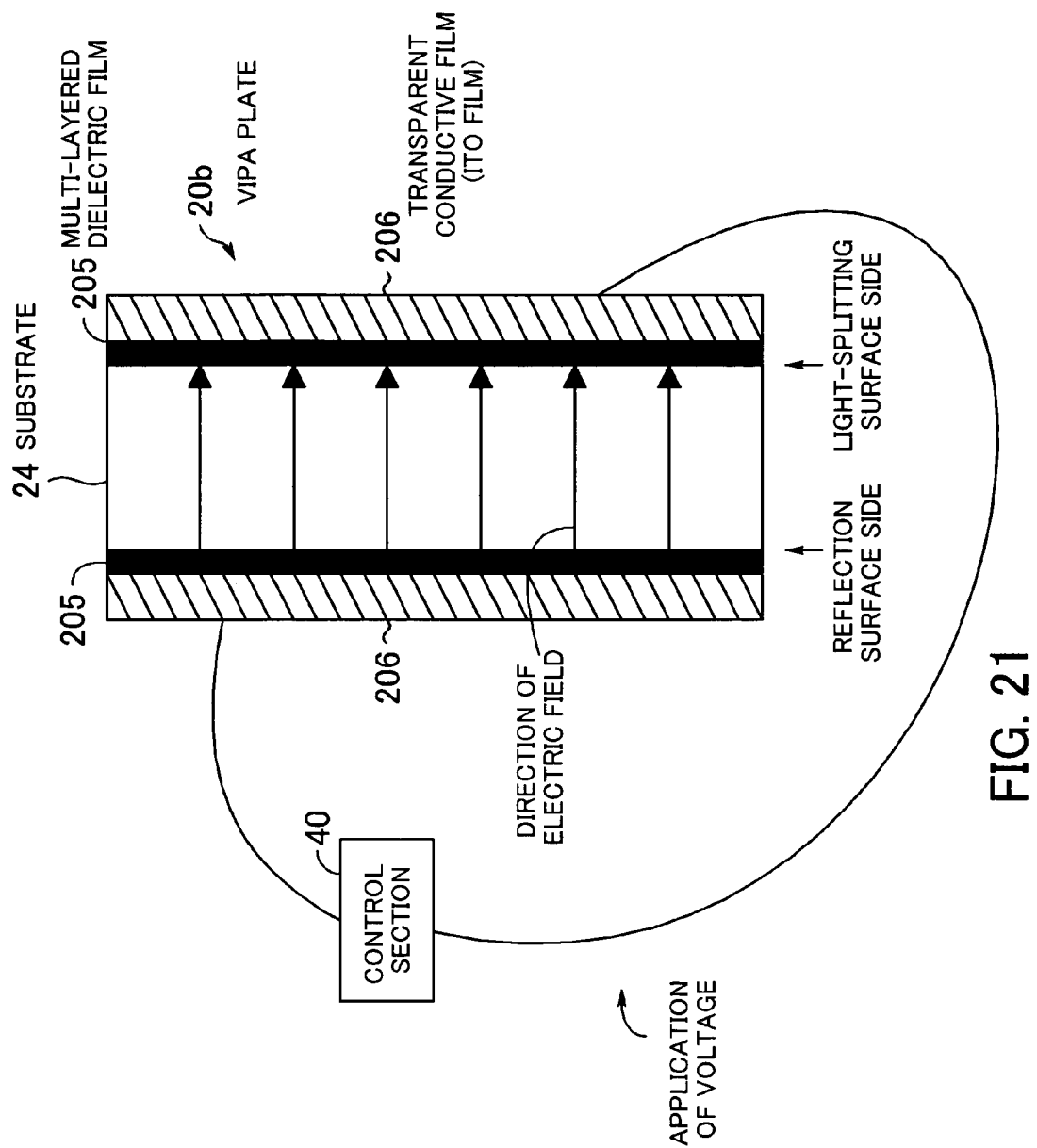
FIG. 21 is a diagram showing a variation of the construction that changes the optical length.

Next, a description will be given of a variation of the construction that changes the optical length through the VIPA plate 20 by making use of electric field. FIG. 21 is a diagram showing a variation of the construction that changes the optical length. Multi-layered dielectric films 205 are coated on the reflection surface and the light-splitting surface of the substrate 24 of the VIPA plate, and transparent conductive films 206 are coated on the multi-layered dielectric films 205 to form a VIPA plate 20b. As the transparent conductive films 206, there may be used ITO films (indium tin oxide film: thin film which is electrically-conductive and at the same time maintains the transparency of glass).

Then, by using the ITO films 206, which do not contribute to optical effects, as electrodes, and applying voltage thereto by the control section 40, electric field is applied to the VIPA plate 20b. This makes it possible to cause a change in refractive index which is proportional to the strength of electric field, so that it is possible to change the optical length through the VIPA plate 20b.

Figure 22:
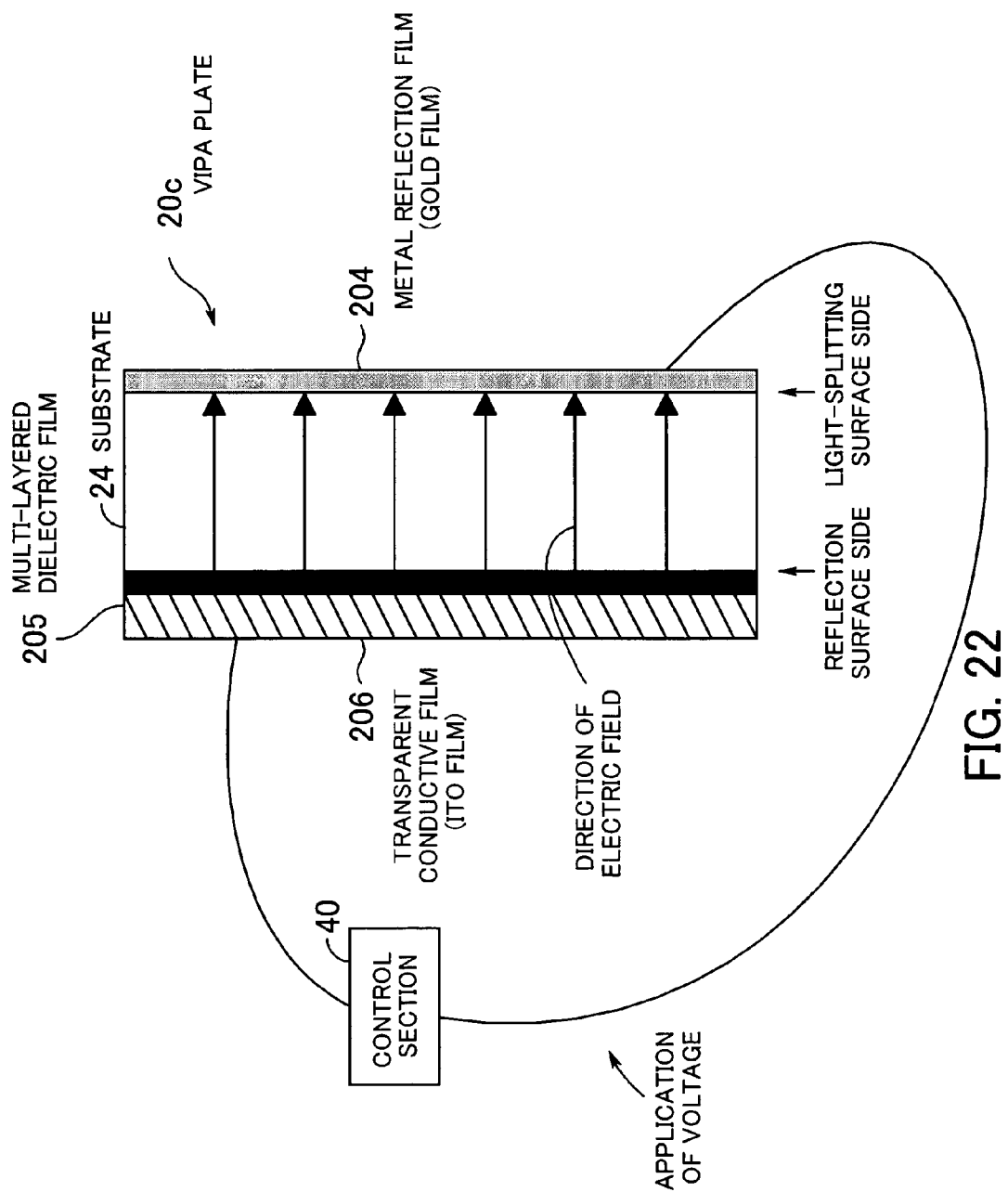
FIG. 22 is a diagram showing another variation of the construction that changes the optical length.

FIG. 22 is a diagram showing a variation of the construction that changes the optical length. On the reflection surface of the substrate 24 of the VIPA plate, the multi-layered dielectric film 205 is coated, and at the same time, an ITO film 206 is coated on the multi-layered dielectric film 205. On the light-splitting surface of the substrate 24, a metal reflection film 204, such as a gold film, is coated as the electrically-conductive film, whereby the VIPA plate 20c is formed.

Then, the ITO film 206 and the metal reflection film 204 are used as the electrodes, and voltage is applied thereto by the control section 40, whereby electric field is applied to the VIPA plate 20c. This makes it possible to cause a change in the refractive index which is proportional to the strength of electric field, and thereby change the optical length through the VIPA plate 20c. It should be noted that the control of the optical length is performed not only to suppress the amount of leakage of portions of adjacent wavelengths into the transmission wavelength, but also to impart the VIPA plate 20 a desired wavelength periodicity as shown in FIG. 6.

As described above, in the present invention, the bandpass filter 13 is provided at a stage preceding the VIPA plate 20, whereby only a beam in one wavelength band at a predetermined period is extracted and caused to enter the VIPA plate 20. Further, the VIPA is configured such that a wavelength (band) to be allowed to pass can be selected as desired by the control section 40, and the optical length can be variably set by temperature control of the VIPA plate 20 or by changing electric field applied thereto. This makes it possible to extract and split a beam in a wavelength band at a singe period, which provides a solution to the problem of a single photoreceptor receiving a plurality of spectral components in wavelength bands at a plurality of periods.

Figure 23:
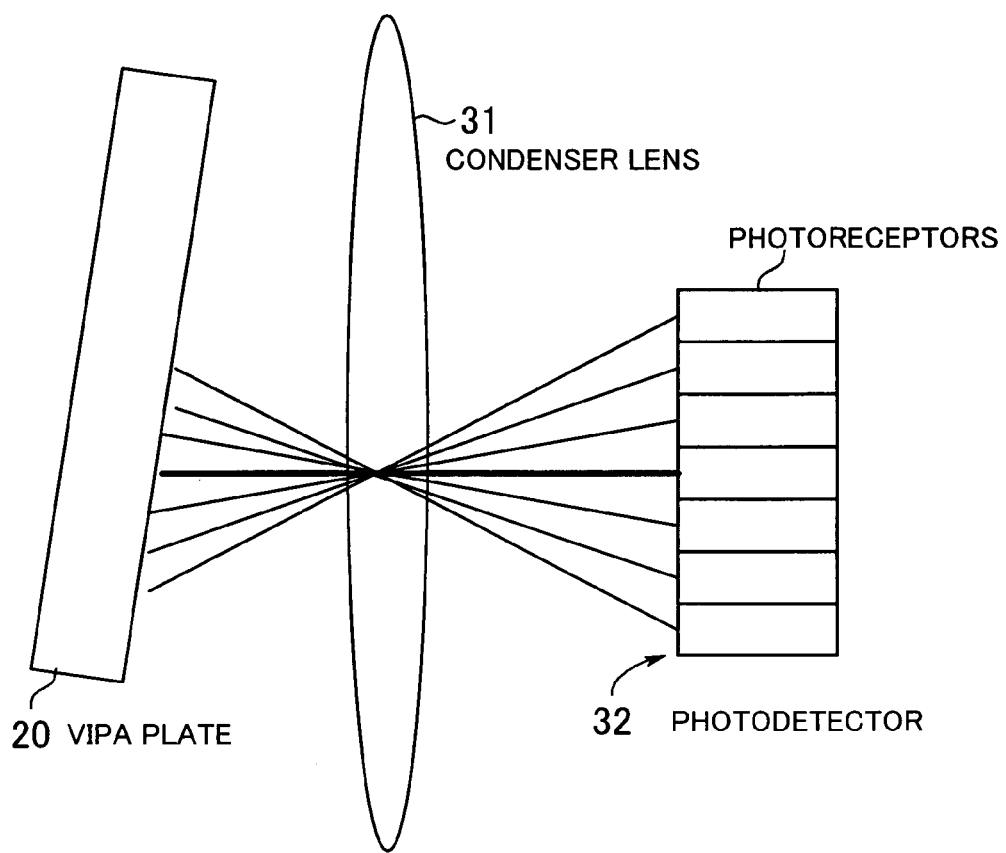
FIG. 23 is a diagram showing the construction of a photodetector.

Next, the photodetector 32 will be described. FIG. 23 is a diagram showing the construction of the photodetector 32. The photodetector 32 is comprised of an array of a plurality of photoreceptors (PDs) in a one-dimensional direction, and the photoreceptors separately receive split beams having respective wavelengths, via the condenser lens 31.

Figure 24:
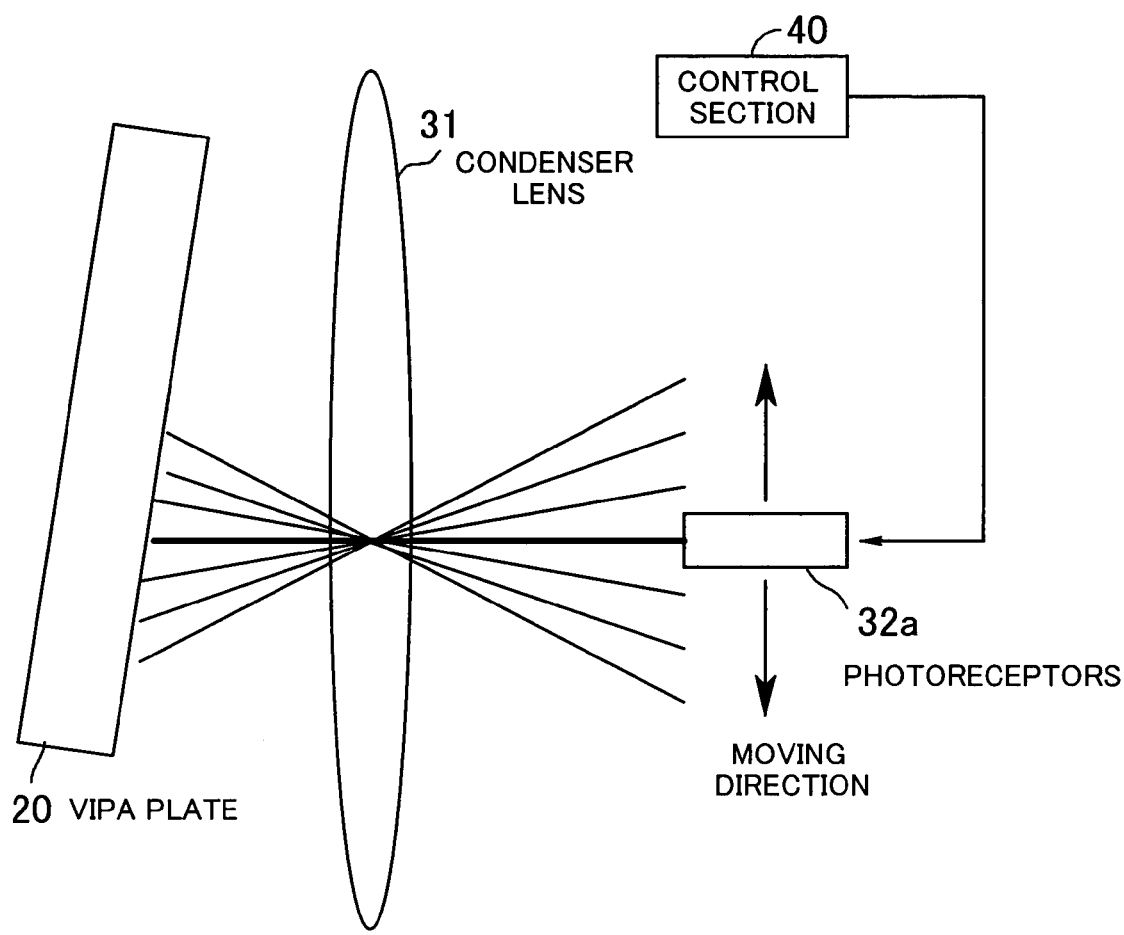
FIG. 24 is a diagram showing the construction of a different photodetector.

FIG. 24 is a diagram showing the construction of the photodetector. The photodetector is formed by a single photoreceptor (PD) 32, and by providing a motor or the like for the photoreceptor 32a, the photodetector is moved in a one-dimensional direction by the control from the control section 40, whereby each split beam having a different wavelength is received by the photoreceptor 32a.

Figure 25:
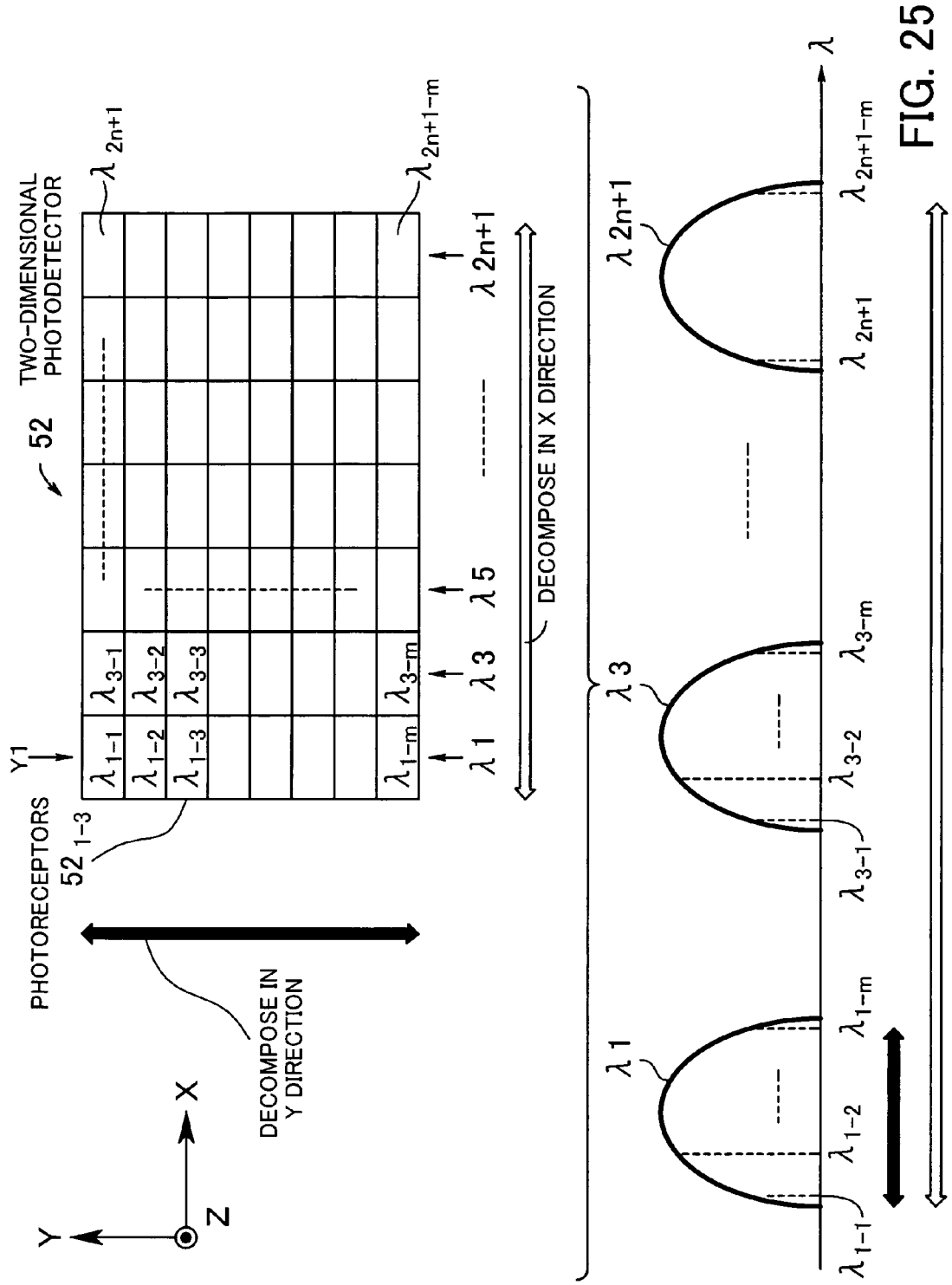
FIG. 25 is a diagram useful in explaining a concept applied to a spectroscopic apparatus according to a second embodiment of the present invention.

Next, a description will be given of a spectroscopic apparatus according to a second embodiment of the present invention, which collectively performs spectroscopic processing on beams without using a bandpass filter. FIG. 25 is a diagram useful for explaining a concept applied to the spectroscopic processing according to the second embodiment, and in the following, the light-splitting direction is referred to as "the Y direction", the direction along the optical axis as "the Z direction", and the direction perpendicular to the light-splitting direction and the optical axis as "the X direction".

In the construction of the first embodiment described above, the VIPA plate 20 does not split light in the X direction, but split the same only in the Y direction, which can causes the problem of respective components of beams in wavelength bands split in the Y direction at respective periods being overlapped on a single photoreceptor, and therefore, to solve the problem, only one wavelength band at one period is extracted or filtered out using the bandpass filter 13 and subjected to splitting.

On the other hand, the spectroscopic apparatus according to the present embodiment without the bandpass filter is configured such that by providing a element for separating wavelengths aligned in the X direction at respective periods from each other, the light is split two-dimensionally. This makes it possible to split light in the Y direction such that a beam in a wavelength band at each period is split, and further, in the X direction such that the light is split according to period, whereby the collective spectroscopic processing of light can be performed without using the bandpass filter.

With this construction, light components having wavelengths split within one wavelength band are aligned in the Y direction. Further, light components at respective associated periods each split from an associated wavelength band are aligned in the X direction. Therefore, when the photoreceptors are arranged on a plane (in a mesh) to form a two-dimensional layout, each single photoreceptor is capable of receiving only one wavelength-component beam.

FIG. 25 shows a case of the period being equal to 2T, and components of wavelength bands $\lambda 1$, $\lambda 3$, ..., $\lambda 2n+1$ are periodically aligned in the X direction, and wavelength components of each wavelength band are aligned in the Y direction. When attention is paid to a Y1 direction, the beam with the wavelength $\lambda 1$ is split into wavelength components $\lambda_{1-1}$, $\lambda_{1-2}$, ..., $\lambda_{1-m}$, in a line. For example, a photoreceptor $52_{1-3}$ within the two-dimensional photodetector 52 is capable of receiving only a beam having a wavelength component $\lambda_{1-3}$. Thus, according to the present embodiment, instead of extracting a wavelength band at one period using the bandpass filter, light is decomposed both in the X direction and Y direction, thereby enabling each single photoreceptor to receive only one wavelength-component beam.

Figure 26:
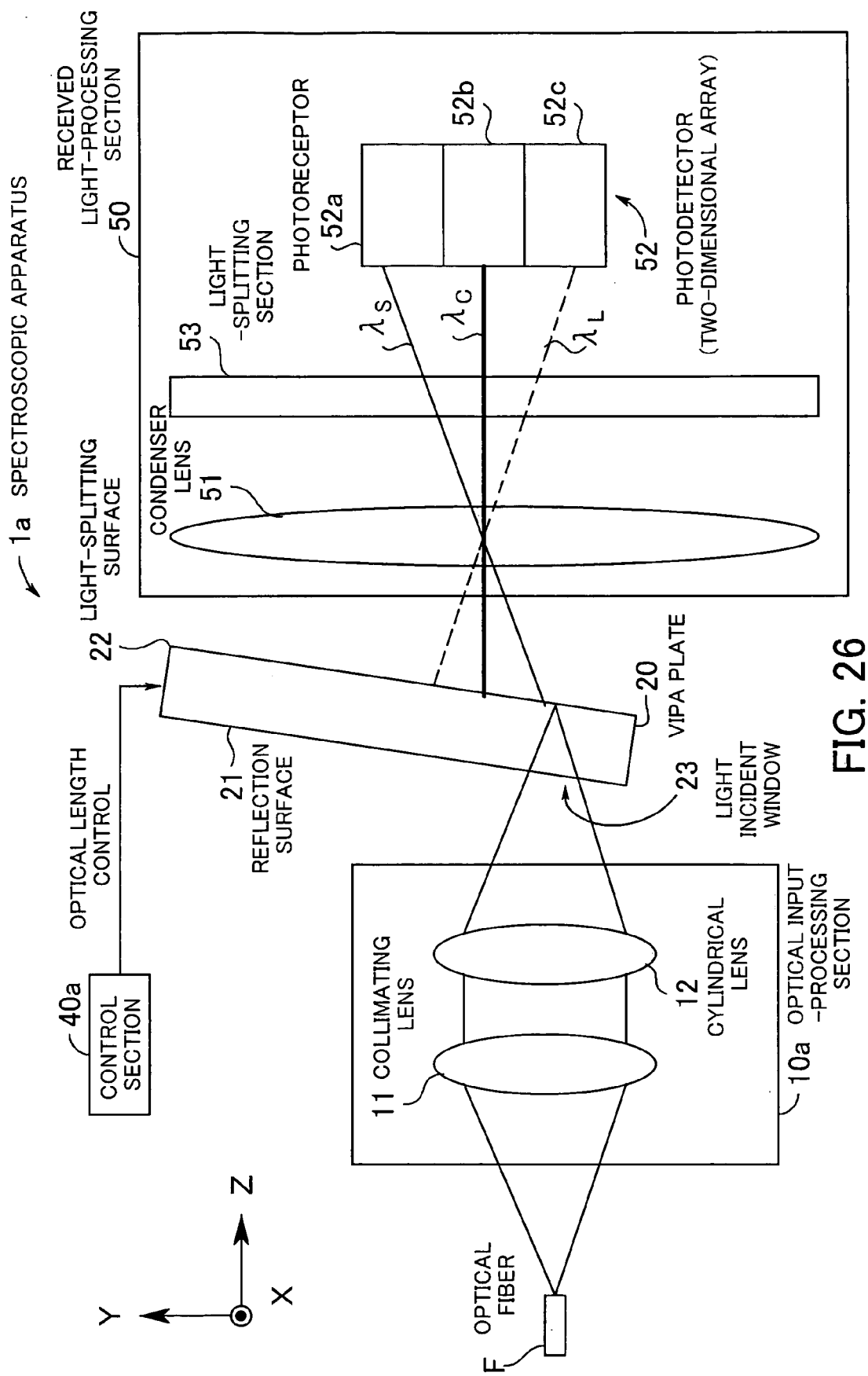
FIG. 26 is a diagram showing the basic arrangement of the spectroscopic apparatus according to the second embodiment.

Next, a description will be given of the construction and operation of the spectroscopic apparatus according to the second embodiment. FIG. 26 is a diagram showing the basic arrangement of the spectroscopic apparatus according to the second embodiment. The spectroscopic apparatus 1a is comprised of an optical input-processing section 10a, the VIPA plate 20, a received light-processing section 50, a control section 40a. The optical input-processing section 10a is comprised of the collimating lens 11 and the cylindrical lens 12. Further, the received light-processing section 50 is comprised of a condenser lens 51, a photodetector 52, and a light-splitting section 53. The light-splitting section 53 is disposed between the condenser lens 51 and the photodetector 52. The collimating lens 11 changes the light emitted from the optical fiber F into collimated light. The cylindrical lens 12 collects the collimated light in a one-dimensional direction and emits the collected beam. The VIPA plate 20 causes the collected beam incident thereon via the light incident window 23 to undergo multiple reflections between the reflection surface 21 and the light splitting surface 22, and emits the split light beams from the light splitting surface 22 in the Y direction.

The condenser lens 51 collects the light emitted from the VIPA plate 20. The light-splitting section 53 splits the light emitted from the condenser lens 51 in a direction (X direction) perpendicular to the light-splitting direction by the VIPA plate 20.

The photodetector 52 is in a two-dimensional layout of a plurality of photoreceptors arranged on a plane for receiving beams, and capable of simultaneously detecting beams split in the X direction and the Y direction, such that each single photodetector detects a single wavelength-component beam to detect an optical spectrum. In FIG. 26, a photoreceptor 52a, for example, receives only a beam having a shorter wavelength $\lambda S$ within one wavelength band, a photoreceptor 52b receives only a beam having an intermediate wavelength $\lambda C$ within the wavelength band, and a photoreceptor 52c receives only a beam having a longer wavelength $\lambda L$ within the wavelength band.

The control section 40a controls at least one of the optical length of light traveling within the VIPA plate 20, the resolution of the light-splitting section 53, and the photodetecting position of the received light-processing section 50 (the control of the resolution of the light-splitting section 53 will be described hereinafter with reference to FIGS. 30 and 31). Here, similarly to the spectroscopic apparatus 1 shown in FIG. 1, in the case of the spectroscopic apparatus 1a as well, the output from the VIPA plate 20 has a periodic structure. Therefore, the control section 40a carries out the optical length control on the VIPA plate 20 by control of temperature or electrooptic effects, such that the output from the control section 40a has a desired periodic structure.

It should be noted that the photodetector 52 may be a one-dimensional array in the Y direction instead of being a two-dimensional array. In this case, a motor or a micrometer is mounted on the photodetector 52 such that it can be moved in the X direction such that the control section 40a causes the one-dimensional array to be moved, thereby enabling the photodetector 52 to receive all wavelength-component beams.

Further, the photodetector 52 may be formed by a single photoreceptor alone. In this case, however, a motor or a micrometer is mounted on the photodetector 52 such that the photodetector 52 can be moved in the X direction and the Y direction such that the control section 40a can cause the single photoreceptor to be moved, thereby enabling the photodetector 52 to receive all wavelength-component beams.

Figure 27:
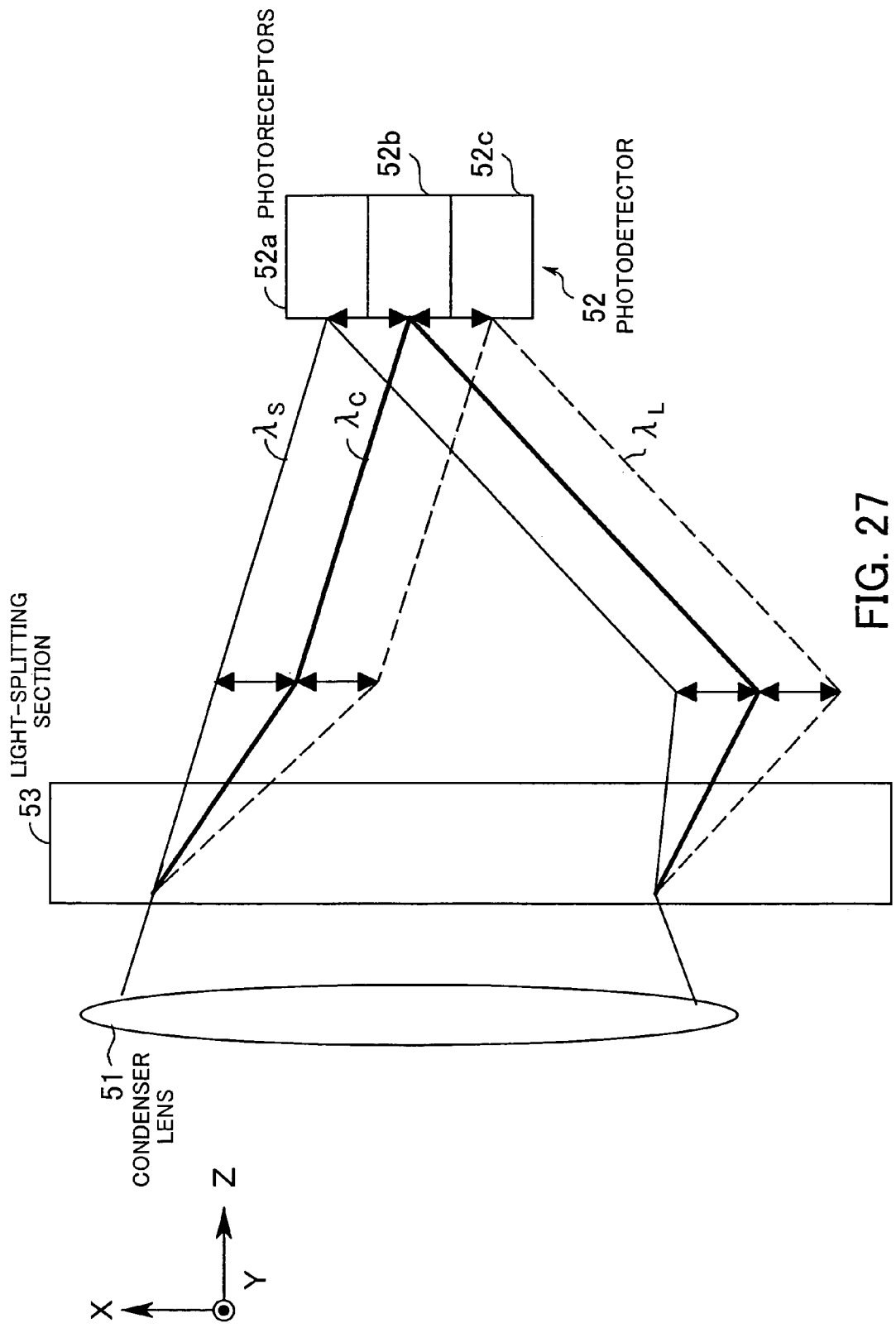
FIG. 27 is a diagram showing the received light-processing section appearing in FIG. 26, as viewed from a Y direction.

FIG. 27 is a diagram of the received light-processing section 50 appearing in FIG. 26 as viewed from the Y direction. In the spectroscopic apparatus 1a, the beams split in the Y direction by the VIPA plate 20 are also split in a direction perpendicular to the light-splitting direction, i.e. in the X direction by the light-splitting section 53, so that when the received light-processing section 50 appearing in FIG. 26 is viewed from the X direction, it is possible to perceive the status of beams having a shorter wavelength $\lambda S$, an intermediate wavelength $\lambda C$, and a longer wavelength $\lambda L$ being split or separate in the Y direction. On the other hand, when the received light-processing section 50 is viewed from the Y direction as in FIG. 27, it is possible to perceive the status of beams having a shorter wavelength $\lambda S$, an intermediate wavelength $\lambda C$, and a longer wavelength $\lambda L$ being split or separate in the X direction.

Figure 28:
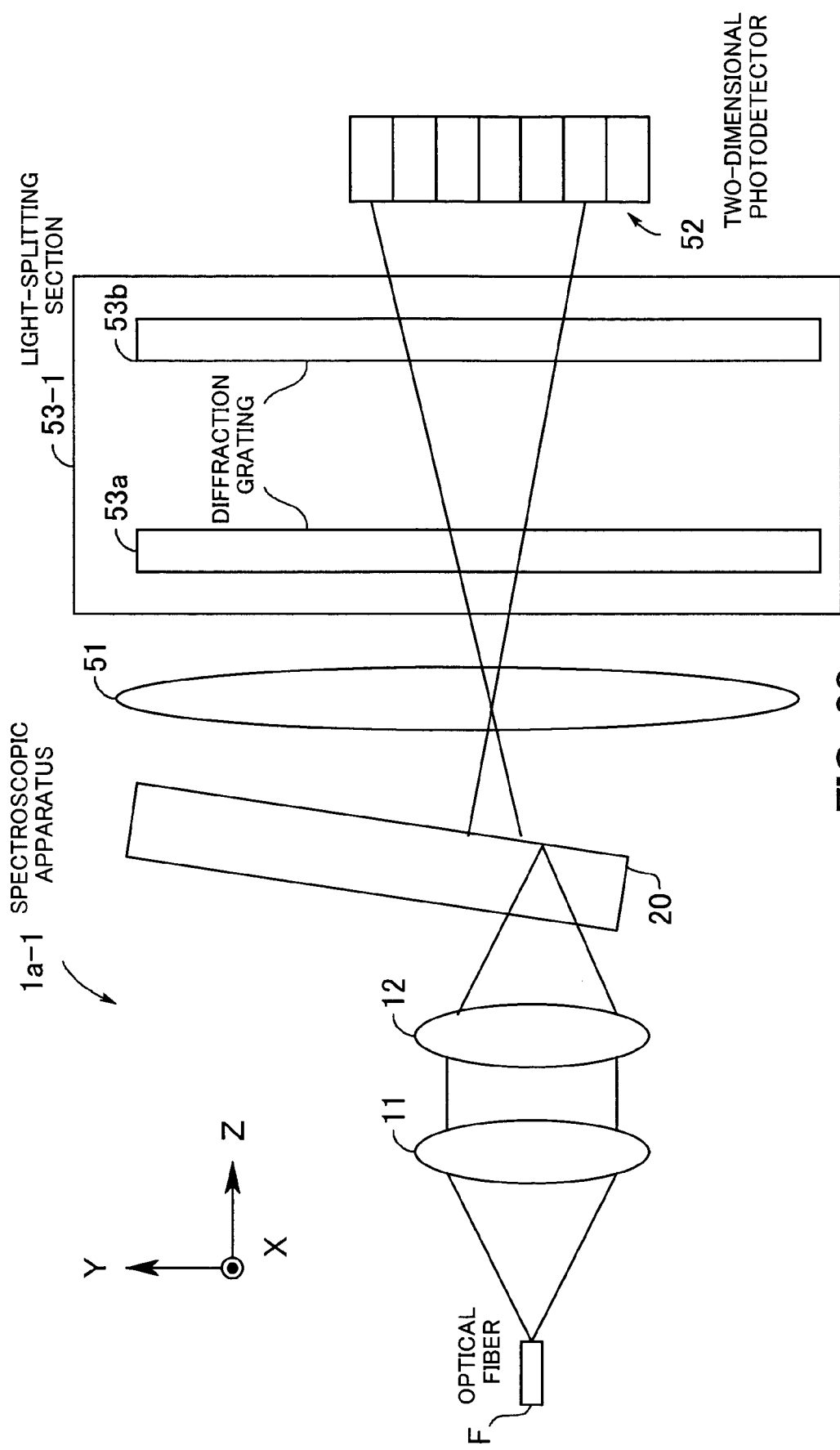
FIG. 28 is a diagram showing the arrangement of the spectroscopic apparatus according to the second embodiment in which a first form of the received light-processing section is used.
Figure 29:
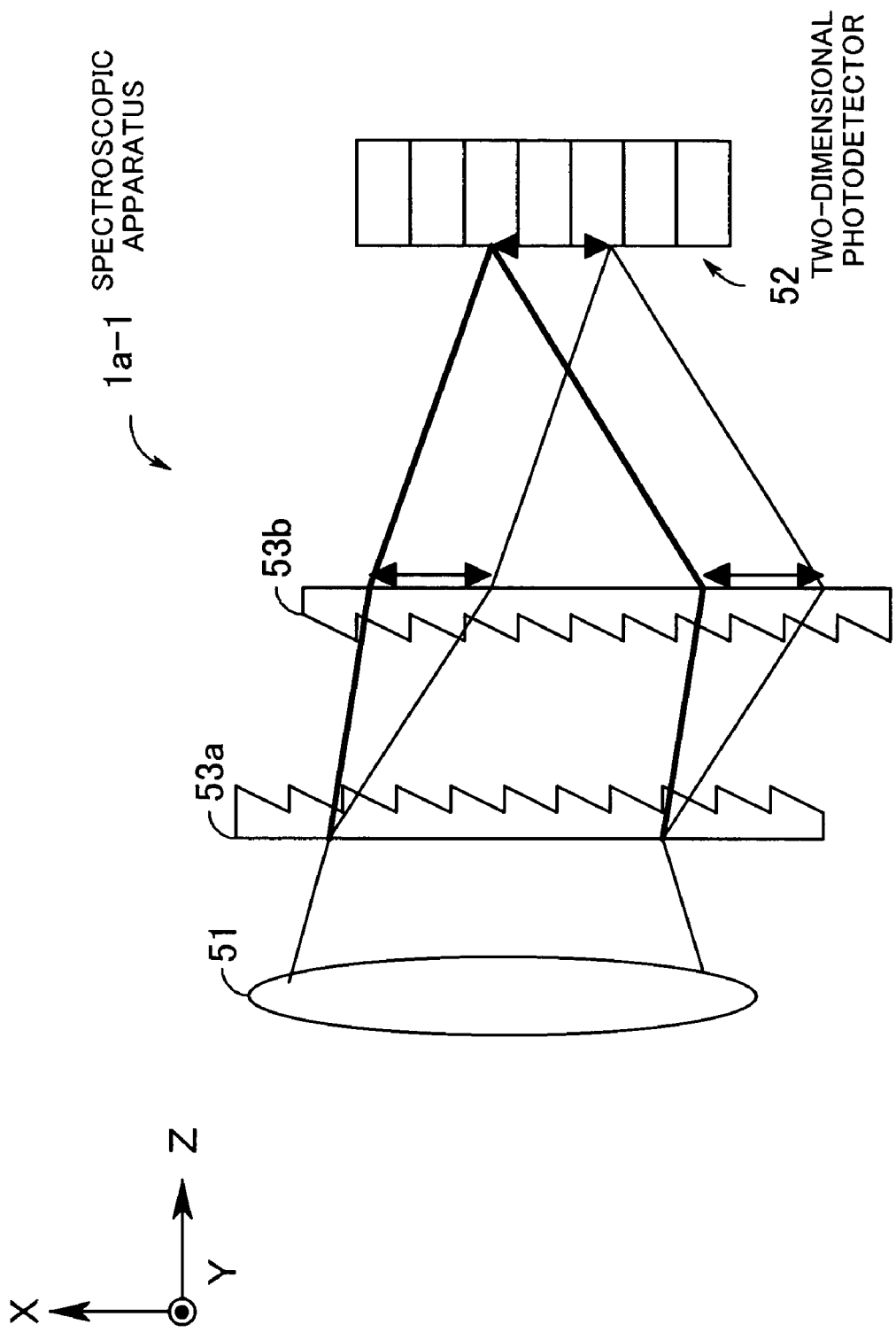
FIG. 29 is a diagram showing the first form of the received light-processing section as viewed from the Y direction.

Next, a detailed description will be given of a first form of the received light-processing section 50. In the first form of the received light-processing section 50, the light-splitting section 53 is comprised of two diffraction gratings. FIGS. 28 and 29 show a spectroscopic apparatus 1a-1 according to the second embodiment in which the first form of the received light-processing section 50 is employed. FIG. 28 is a diagram of the spectroscopic apparatus 1a-1 as viewed from the X direction, while FIG. 29 is a diagram of the received light-processing section 50 of the spectroscopic apparatus 1a-1 as viewed from the Y direction.

The light-splitting section 53-1 includes two transmission diffraction gratings 53a and 53b which forms a diffraction grating pair (grooves in the gratings are opposed to each other). The diffraction grating 53a has a function of separating wavelength-beams aligned according to period in the X direction from each other. The diffraction grating 53b has grooves thereof opposed to the grooves of the diffraction grating 53a, and has a function of forming the beams split by the first one or diffraction grating 53a into collimated light beams. With this construction, the incident light can be split in the Y direction by the VIPA plate 20, and in the X direction by the light-splitting section 53-1, and the two-dimensional photodetector 52 is capable of receiving wavelength-component beams separately and simultaneously.

Figure 30:
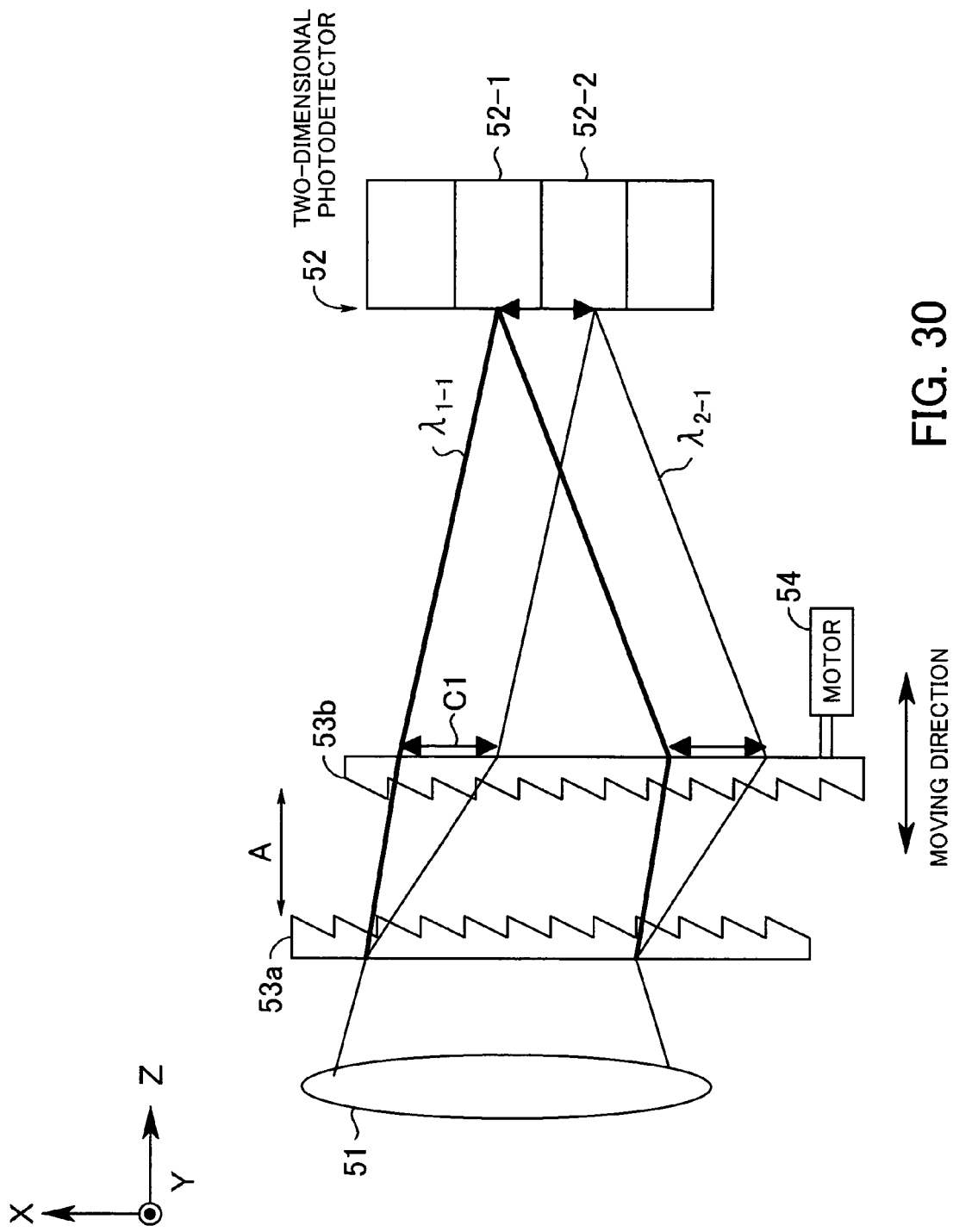
FIG. 30 is a diagram useful in explaining a change in the distance between diffraction gratings of a diffraction grating pair.
Figure 31:
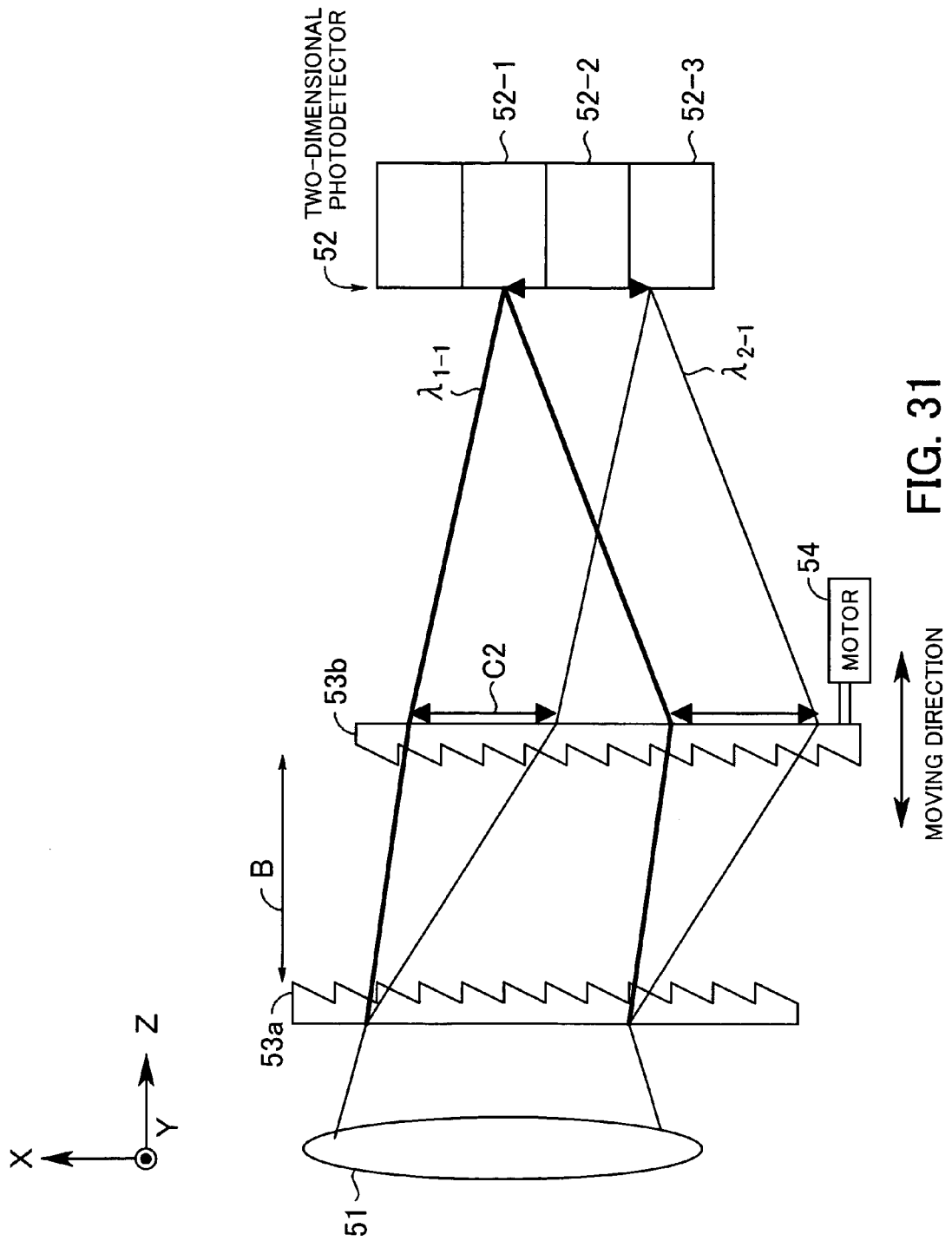
FIG. 31 is a diagram useful in explaining the change in the distance between the diffraction gratings of the diffraction grating pair.

FIGS. 30 and 31 are diagrams useful in explaining a change in the distance between diffraction gratings of the diffraction grating pair. The distance between the diffraction grating 53a and the diffraction grating 53b is made variable by providing a motor 54 (or a micrometer) for the diffraction grating 53b, and causing the diffraction grating 53b to be moved in directions indicated in these figures under the control of the control section 40a (in FIG. 31, the diffraction grating 53b is moved backward).

By changing the distance between the diffraction gratings 53a and 53b, it is possible to change the spacing between adjacent wavelengths. For example, when the distance between the diffraction gratings 53a and 53b is reduced, the adjacent wavelengths are maintained close to each other to be parallel with each other, while when the distance between the diffraction gratings 53a and 53b is increased, the adjacent wavelengths are maintained remote from each other to transmit in parallel with each other.

For example, in FIG. 30, assuming that the distance between the diffraction gratings is A, and the spacing between beams having wavelengths $\lambda_{1-1}$ and $\lambda_{2-1}$ is C1, the photoreceptor 52-1 receives the beam having the wavelength $\lambda_{1-1}$ and the photoreceptor 52-2 receives the beam having the wavelength $\lambda_{2-1}$. In this case, the beams having wavelengths at adjacent periods are received by the photoreceptors 52-1 and 52-2 close to each other, so that there is a fear of the photoreceptors receiving a beam in which a component of an adjacent beam thereto leaks therein, which can cause an inconvenience in observation of the spectrum.

To eliminate the inconvenience, as shown in FIG. 31, the distance between the diffraction gratings is increased to B (>A), whereby the distance between beams having wavelengths $\lambda_{1-1}$ and $\lambda_{2-1}$ is increased to C1 (>C2). Then, the photoreceptor 52-1 receives the beam having the wavelength $\lambda_{1-1}$ and the photoreceptor 52-3 receives the beam having the wavelength $\lambda_{2-1}$. This makes it possible to suppress leaking of beams into adjacent beams, whereby the accuracy of observation can be enhanced. As described above, through adjustment of the distance between the diffraction grating pair to put them to the optimum position by the control section 40a, it is possible to increase the resolution in the X direction.

Figure 32:
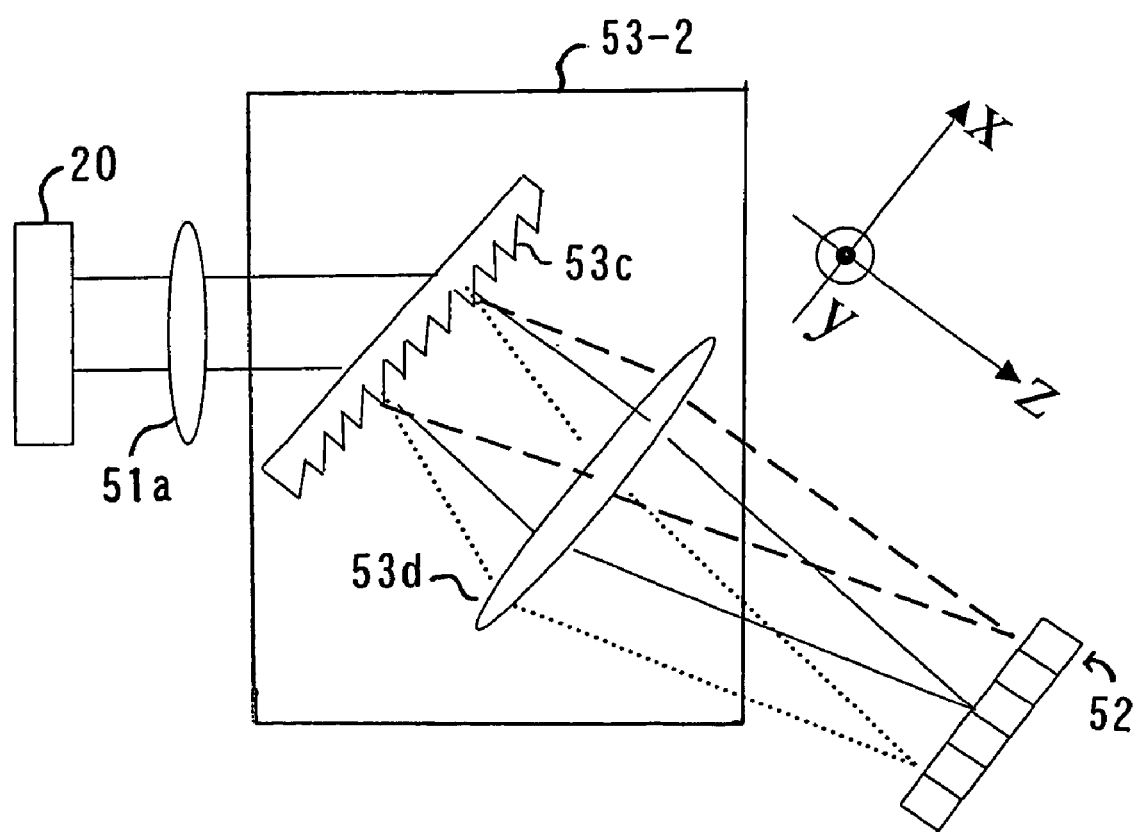
FIG. 32 is a diagram showing the arrangement of essential parts of a variation of the spectroscopic apparatus according to the second embodiment in which the second form of the received light-processing section is used.

Next, a detailed description will be given of a second form of the received light-processing section 50. In the second form of the received light-processing section 50, the condenser lens disposed immediately after the VIPA plate 20 is formed by a lens for collecting the beams from the VIPA plate 20 only in the light-splitting direction (Y direction), and the light-splitting section 53 is comprised of one diffraction grating and one condenser lens. FIG. 32 is a diagram showing the arrangement of essential parts of a variation of the spectroscopic apparatus according to the second embodiment in which the second form of the received light-processing section 50 is employed.

The light-splitting section 53-2 includes a transmission diffraction grating 53c and a condenser lens 53d. The diffraction grating 53c is an element for splitting light in the X direction, and the condenser lens 53d is for collecting light in the X direction. Further, the condenser lens 51a is implemented by a lens for collecting light only in the Y direction (the condenser lens 51 used in the above-described embodiments and variations is for collecting light in the X direction and the Y direction).

Figure 33:
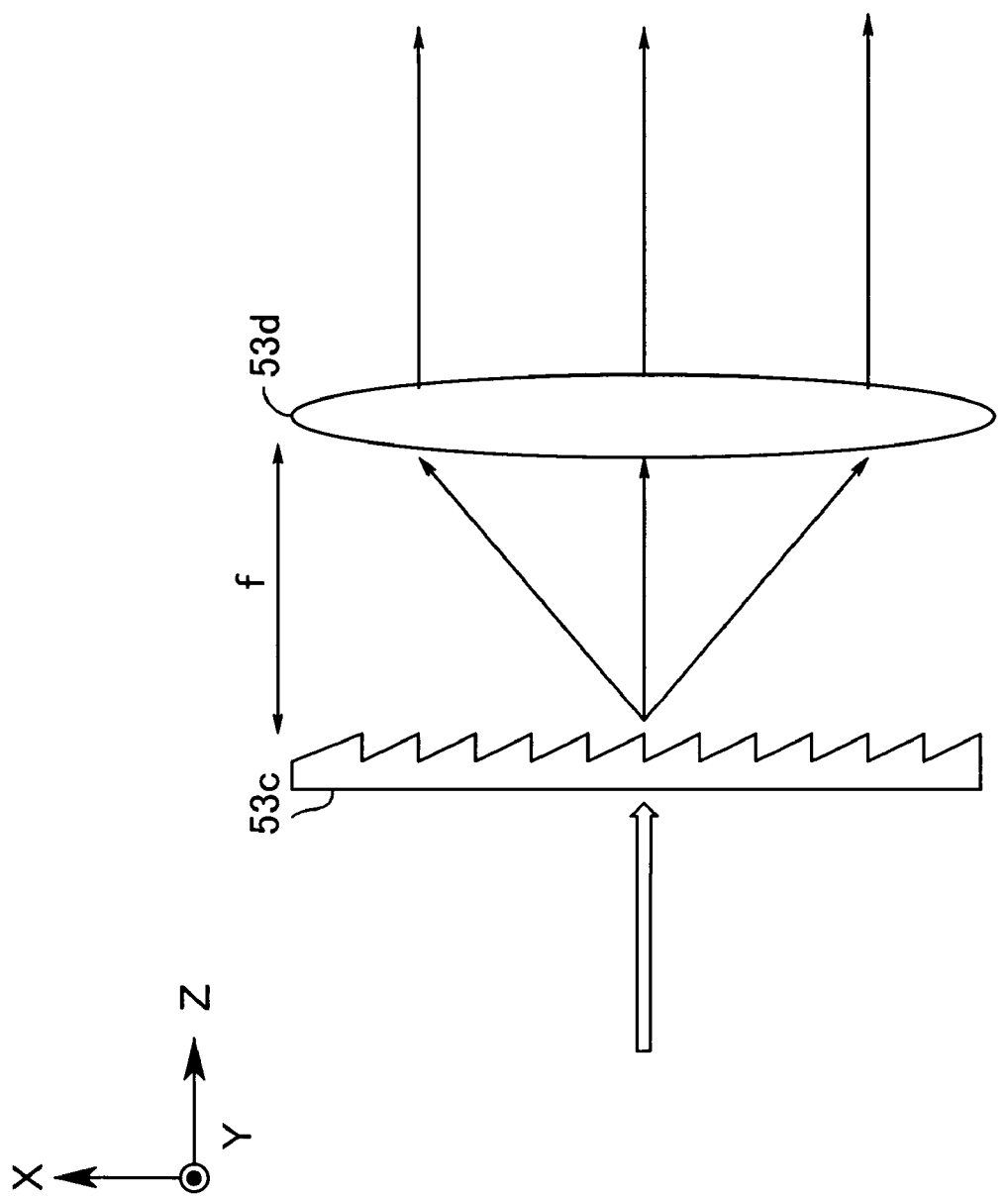
FIG. 33 is a diagram showing the relationship between a diffraction grating and a condenser lens.

The VIPA plate 20 emits, similarly to the above, beams having wavelengths within each periodic wavelength band which are split in the Y direction. Then, the split beams emerging from the VIPA plate 20 are split in the X direction by the following transmission diffraction grating 53c. FIG. 33 is a diagram showing the relationship between the diffraction grating 53c and the condenser lens 53d. Assuming that the focal length of the condenser lens 53d for collecting light in the X direction is equal to f, it is possible to form the beams split in the X direction which are emitted from the diffraction grating 53c, into collimated light beams, by disposing the condenser lens 53d at a distance of f from the diffraction grating 53c.

That is, the condenser lens 53d is a lens for forming the beams split by the diffraction grating 53c into collimated light beams, and is configured to have the same function as that of the diffraction grating (second one) 53b of the diffraction grating pair of the first form of the received light-processing section 50.

Travel of light occurring in the spectroscopic apparatus according to the second embodiment in which the second form of the received light-processing section 50 can be summarized as follows: The VIPA plate 20 emits beams split in the Y direction, and these beams are collected in the Y direction by the condenser lens 51a. The beams collected by the condenser lens 51a are split in the X direction by the diffraction grating 53c, and the resulting beams are formed into collimated light beams by the condenser lens 53d, followed by being received by the two-dimensional photodetector 52.

With this construction, light can be split in the Y direction by the VIPA plate 20, and in the X direction by the light-splitting section 53-2, and the two-dimensional photodetector 52 is capable of receiving wavelength-component beams separately and simultaneously.

Figure 34:
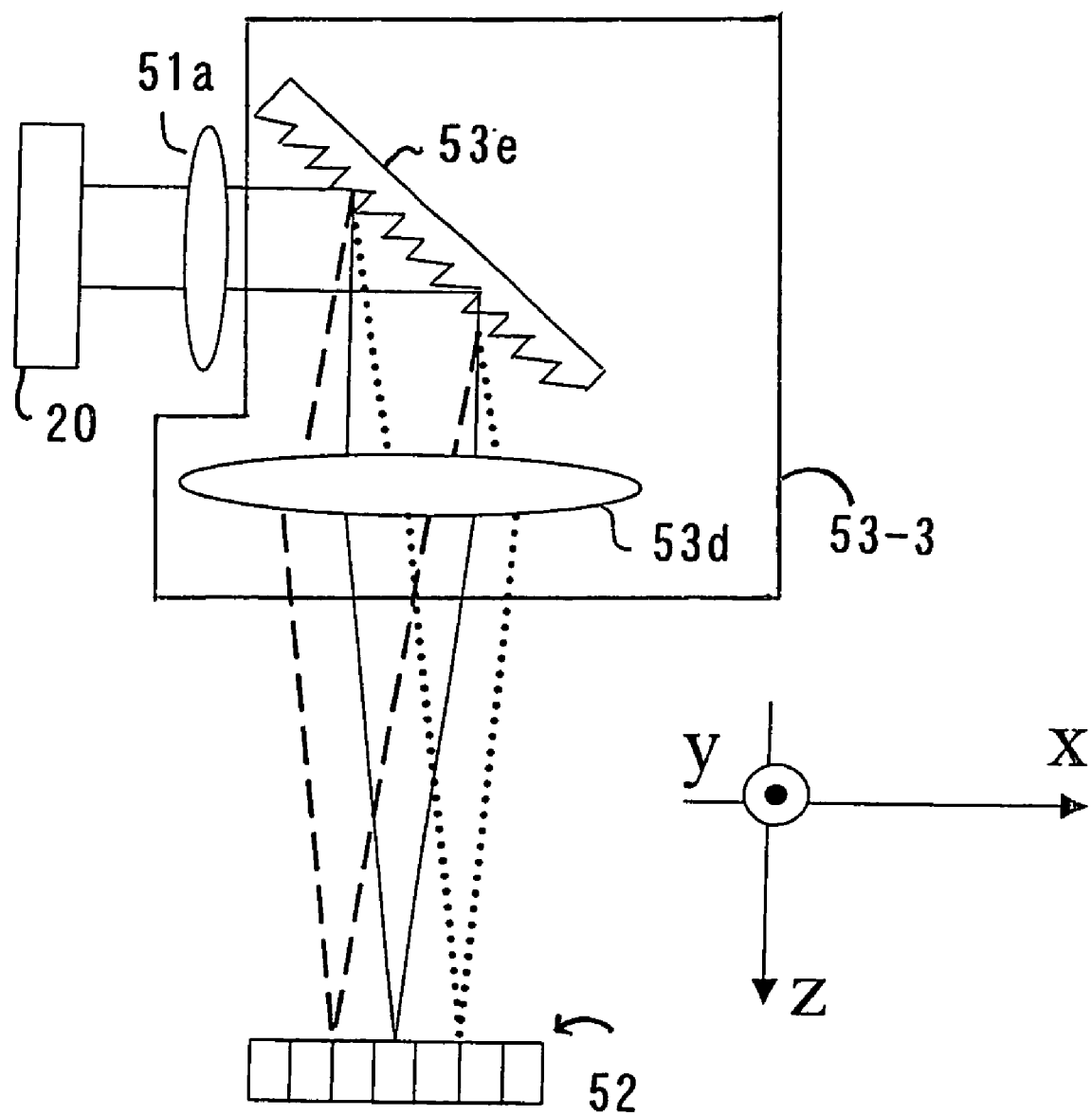
FIG. 34 is a diagram showing the arrangement of essential parts of another variation of the spectroscopic apparatus according to the second embodiment in which a reflective diffraction grating is used.

FIG. 34 is a diagram showing the arrangement of essential parts of a variation of the second embodiment of the invention in which a reflection diffraction grating is employed. In this variation, the transmission diffraction grating 53c appearing in FIG. 32 is replaced by a reflection diffraction grating 53e. The light-splitting section 53-3 includes the reflection diffraction grating 53e, and a condenser lens 53d. The diffraction grating 53e is an element for splitting light in the X direction, and the condenser lens 53d is for collecting light in the X direction. Further, the condenser lens 51a is implemented by a lens for collecting light only in the Y direction. With this arrangement, it is possible to split light in the X direction, and form beams obtained by split into collimated light beams, whereby the spectroscopic processing can be performed without the bandpass filter.

Figure 35:
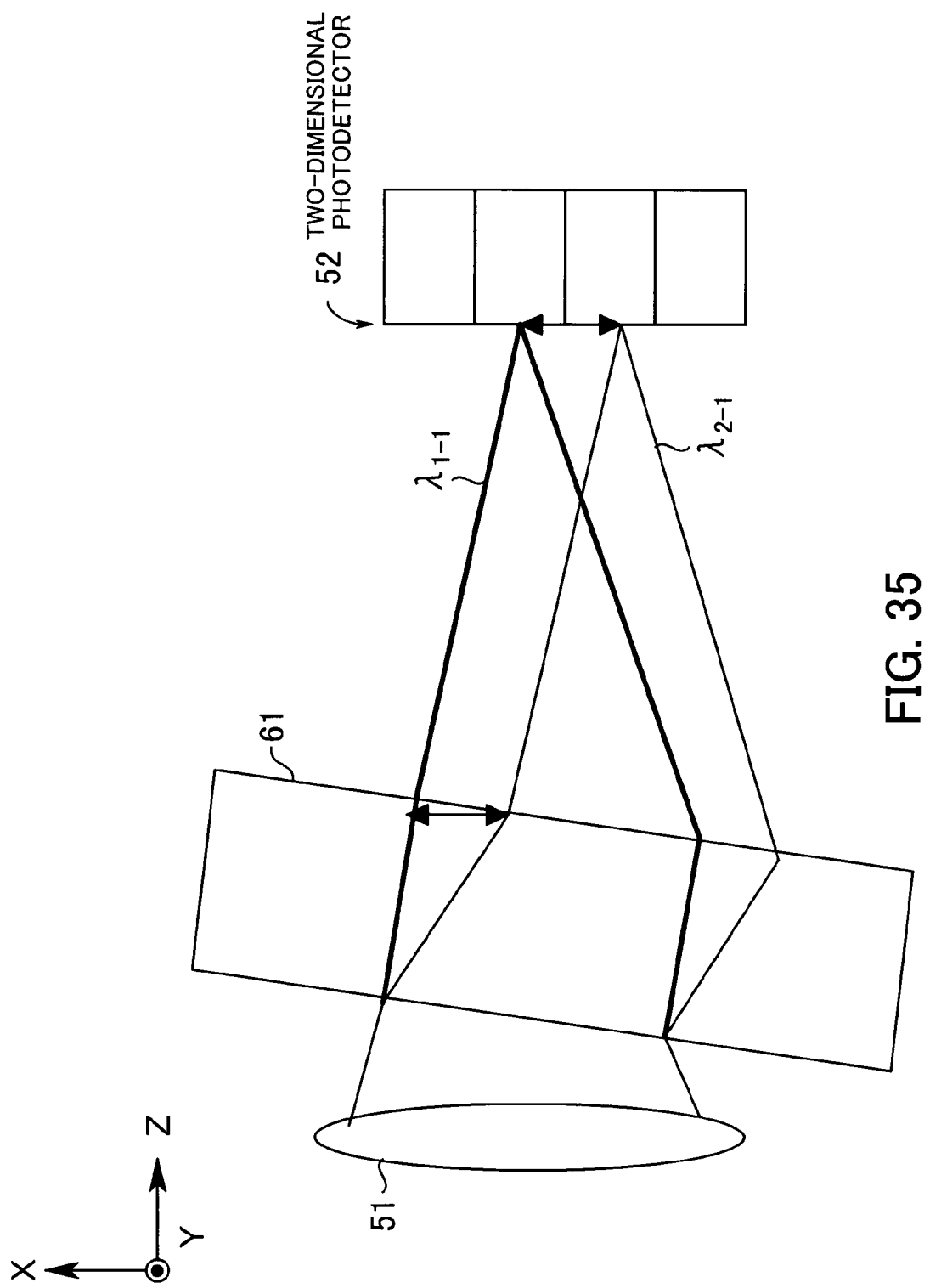
FIG. 35 is a diagram showing the arrangement of essential parts of another variation of the spectroscopic apparatus according to the second embodiment in which a prism is used.
Figure 36:
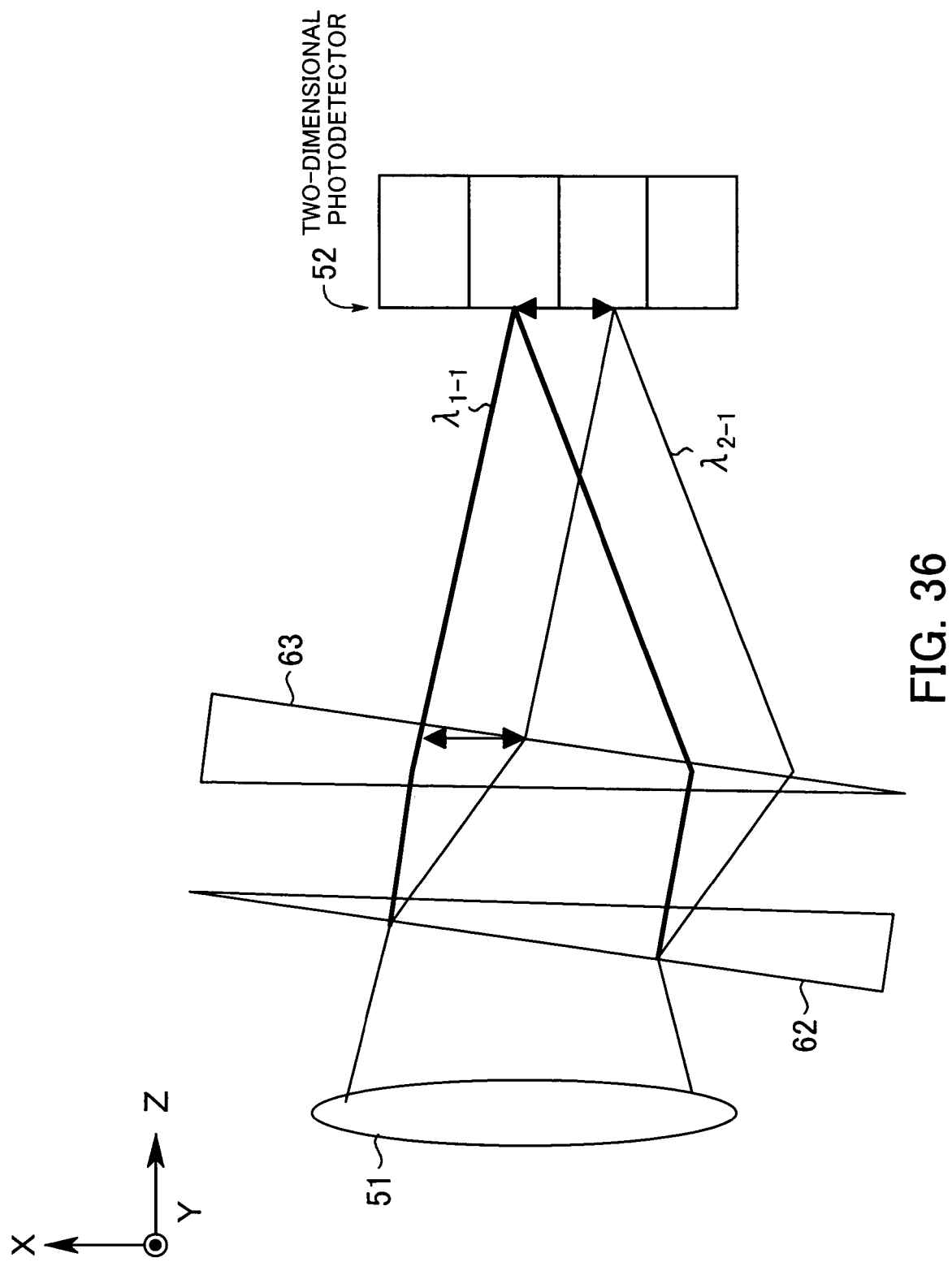
FIG. 36 is a diagram showing the arrangement of essential parts of another variation of the spectroscopic apparatus according to the second embodiment in which prisms are used.

Next, a description will be given of other variations of the second embodiment of the invention in which the diffraction grating is replaced by a prism. FIGS. 35 and 36 shows the arrangements of essentials parts of these variations in which a prism is employed. The use of the diffraction grating as an element for splitting light in the X direction has been described heretofore. However, an element capable of splitting light, such as a prism, can realize the same function in place of the diffraction grating.

FIG. 35 shows an arrangement in which a prism block 61 is obliquely disposed, while FIG. 36 shows an arrangement in which a pair of prisms 62 and 63 replace the diffraction grating pair. These arrangements can have the same capability as that of the diffraction grating pair. It should be noted that fine adjustment of the distance between the prisms 62 and 63 is performed beforehand to set the distance to a fixed value according to a design value.

Figure 37:
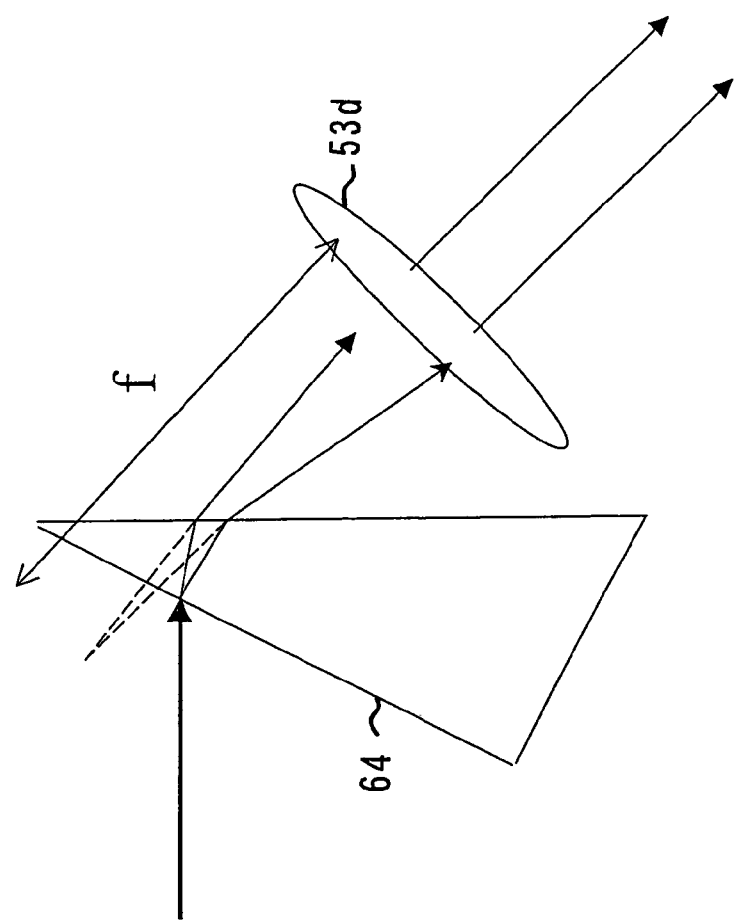
FIG. 37 is a diagram showing the arrangement of essentials parts of another variation of the spectroscopic apparatus according to the second embodiment in which diffraction is performed using a prism.
Figure 38:
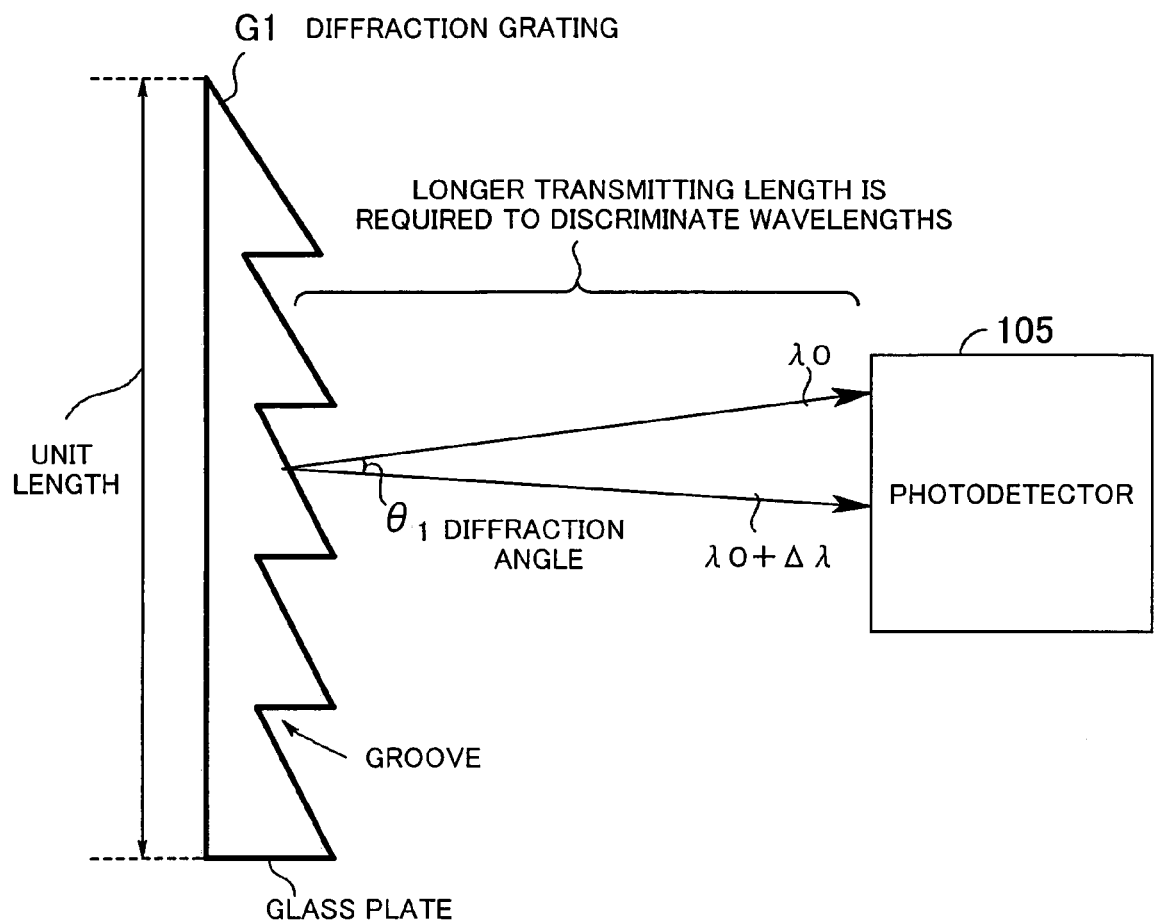
FIG. 38 is a diagram showing diffracted beams generated by a diffraction grating.
Figure 39:
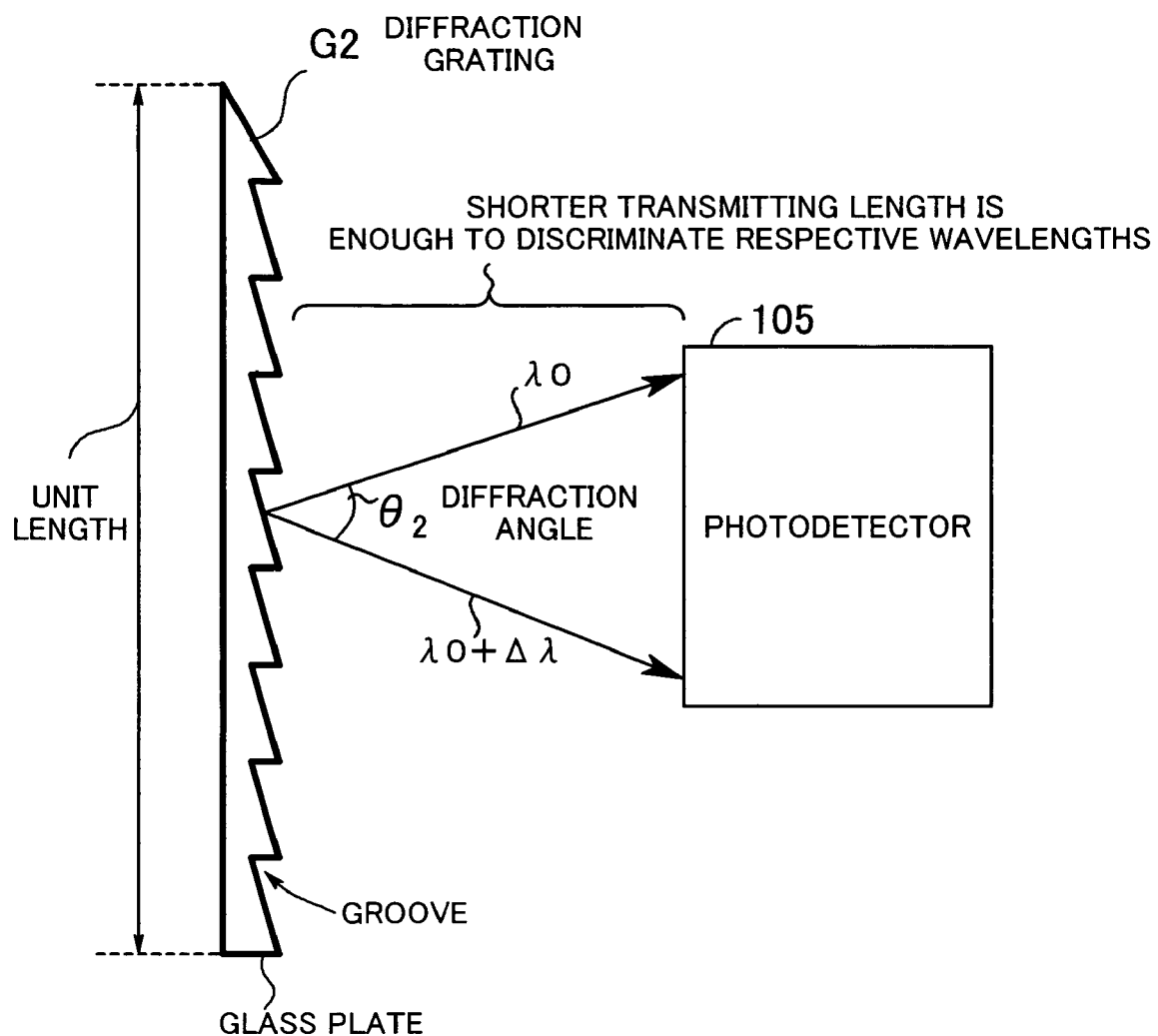
FIG. 39 is a diagram showing diffracted beams generated by a different diffraction grating.

FIG. 37 is a diagram showing the arrangement of essentials parts of another variation of the second embodiment of the present invention, in which diffraction is performed using a prism. This variation corresponds to the combination of the transmission diffraction grating 53c and the condenser lens 53d shown in FIG. 32, and a prism 64 and a condenser lens 53d replace the transmission diffraction grating 53c and the condenser lens 53d, respectively. This arrangement has the same capability as that described hereinabove with reference to FIG. 32.

As described heretofore, according to the present invention, it is possible to make the diffraction angle larger than conventional spectroscopes using a diffraction grating, and make the spectroscopic apparatus compact in size. Further, the spectroscopic apparatus according to the present invention is capable of performing spectroscopic measurement with a higher resolution, so that it becomes possible to measure extinction phenomena which thus far have been undetectable for measurement. Although the control of the bandpass filter has been described above mainly based on the example in which only a wavelength band at one period is allowed to pass, this is not limitative, but depending on the use conditions of the apparatus, the bandpass filter may be configured to pass wavelength bands at a plurality of periods (for example, to detect beams of 2 channels, beams at two periods are filtered out, i.e. allowed to pass). Further, as the photoreceptors of the photodetector, PDs (photodiodes) made of a material, such as InGaAs or Si, may be used, or depending on the use of the spectroscopic apparatus, a CCD camera or an infrared vision camera can replace the photodetector.

The spectroscopic apparatus according to the present invention generates a filtered transmitted light by filtering an input light, and the filtered transmitted light is collected into a collected light beam. Then, the collected light beam is caused to be incident on an optic including a first reflection surface and a second reflection surface which are high but asymmetric in reflectivity, whereby the incident collected beam is caused to undergo multiple reflections between the first reflection surface and the second reflection surface, causing split beams to emerge from the second reflection surface. These split beams are subjected to received light processing. This makes it possible to prevent beams from being emitted at the same angle when the light is split into beams, by restricting light inputted to the spectroscopic apparatus. The spectroscopic apparatus according to the present invention, which is applicable to optical measurement in general, is capable of performing high-precision light-splitting with a large angular dispersion, without a diffraction grating, and at the same time, reduce the size of the apparatus. Further, by controlling the thickness between the first reflection surface and the second reflection surface such that it is substantially changed, it is possible to change the passband of a filter formed by an element comprised of the first reflection surface and the second reflection surface. This makes it possible to perform filtering by shifting a region which does not pass wavelengths, in spectral periods of the element comprised the first reflection surface and the second reflection surface, which enables wavelengths to be continuously detected.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A spectroscopic apparatus that performs splitting of light, comprising:
    an optical input-processing section that forms a filtered transmitted light, and collects the filtered transmitted light, and collects the filtered transmitted light to generate a collected beam, the optical input-processing section including a bandpass filter through which an input light is transmitted to form a filtered transmitted light;
    an optic that includes a first reflection surface and a second reflection surface and causes the collected beam incident thereon to undergo multiple reflections within an inner region between the first reflection surface and the second reflection surface, to thereby cause split beams to be emitted via the second reflection surface; and
    a control section that variably controls at least one of a filter characteristic of the bandpass filter and an optical length through the optic,
    wherein the optical input-processing section includes a lens for forming the input light into a collimated light, a front-side condenser lens that collects the filtered transmitted light in a one-dimensional direction to thereby emit the collected beam, and the bandpass filter disposed between the lens and the front-side condenser lens, for passing only a wavelength band of the collimated light at one period, to thereby output the filtered transmitted light.

2. A spectroscopic apparatus that performs splitting of light, comprising:
    an optical input-processing section that forms a filtered transmitted light, and collects the filtered transmitted light to generate a collected beam, the optical input-processing section including a bandpass filter through which an input light is transmitted to form the filtered transmitted light;
    an optic that includes a first reflection surface and a second reflection surface and causes the collected beam incident thereon to undergo multiple reflections within an inner region between the first reflection surface and the second reflection surface, to thereby cause split beams to be emitted via the second reflection surface; and
    a control section that variably controls at least one of a filter characteristic of the bandpass filter and an optical length through the optic,
    wherein the bandpass filter comprises a sloped film formed by deposition of multiple layers of dielectric films each varying in thickness, and
    wherein the control section causes the bandpass filter to move for a change in a slope position of the sloped film where the input light is incident, so as to change a wavelength band allowed to pass according to the slope position, thereby selecting the wavelength band allowed to pass.

3. A spectroscopic apparatus that performs splitting of light, comprising:
    an optical input-processing section that forms a filtered transmitted light, and collects the filtered transmitted light to generate a collected beam, the optical input-processing section including a bandpass filter through which an input light is transmitted to form the filtered transmitted light;
    an optic that includes a first reflection surface and a second reflection surface and causes the collected beam incident thereon to undergo multiple reflections within an inner region between the first reflection surface and the second reflection surface, to thereby cause split beams to be emitted via the second reflection surface; and
    a control section that variably controls at least one of a filter characteristic of the bandpass filter and an optical length through the optic,
    wherein the control section carries out temperature control of the optic to thereby change the optical length through the optic,
    wherein a container including a heater and formed with a light entrance and a light exit has the optic gastightly sealed therein to form a thermostatic bath, and
    wherein the control section carries out the temperature control of the heater to thereby change the optical length through the optic.

4. A spectroscopic apparatus that performs splitting of light, comprising:
    an optical input-processing section that forms a filtered transmitted light, and collects the filtered transmitted light to generate a collected beam, the optical input-processing section including a bandpass filter through which an input light is transmitted to form the filtered transmitted light;
    an optic that includes a first reflection surface and a second reflection surface and causes the collected beam incident thereon to undergo multiple reflections within an inner region between the first reflection surface and the second reflection surface, to thereby cause split beams to be emitted via the second reflection surface; and
    a control section that variably controls at least one of a filter characteristic of the bandpass filter and an optical length through the optic,
    wherein the optic has a substrate made of a material large in an electrooptic effect,
    wherein the control section applies electric field to the optic to change a refractive index thereof, thereby causing the optical length through the optic to be changed,
    wherein the optic is configured to have multilayered dielectric films formed on the first reflection surface and the second reflection surface, and transparent electrically-conductive films formed on the multi-layered dielectric films for use as electrodes, and
    wherein the control section applies voltage to the transparent electrically-conductive films to apply electric field to the optic, thereby causing the optical length through the optic to be changed.

5. A spectroscopic apparatus that performs splitting of light, comprising:
an optical input-processing section that forms a filtered transmitted light, and collects the filtered transmitted light to generate a collected beam, the optical input-processing section including a bandpass filter through which an input light is transmitted to form the filtered transmitted light;
an optic that includes a first reflection surface and a second reflection surface and causes the collected beam incident thereon to undergo multiple reflections within an inner region between the first reflection surface and the second reflection surface, to thereby cause split beams to be emitted via the second reflection surface; and
a control section that variably controls at least one of a filter characteristic of the bandpass filter and an optical length through the optic;
wherein the optic has a substrate made of a material large in an electrooptic effect,
wherein the control section applies electric field to the optic to change a refractive index thereof, thereby causing the optical length through the optic to be changed,
wherein the optic is configured to have a multilayered dielectric film formed on the first reflection surface and a transparent electrically-conductive film formed on the multi-layered dielectric film, and an electrically-conductive metal reflection film formed on the second reflection surface, whereby the transparent electrically-conductive film and the metal reflection film are used as electrodes, and
wherein the control section applies voltage to the transparent electrically-conductive film and the metal reflection film to apply electric field to the optic, thereby causing the optical length through the optic to be changed.

6. A spectroscopic apparatus that performs splitting of light, comprising:
an optical input-processing section that collects input light to form a collected beam;
an optic that includes a first reflection surface and a second reflection surface and causes the collected beam incident thereon to undergo multiple reflections within an inner region between the first reflection surface and the second reflection surface, to thereby cause split beams to be emitted via the second reflection surface; and
a control section that variably controls at least one of an optical length and a spectral resolution of the optic,
wherein the control section carries out temperature control of the optic to thereby change the optical length through the optic,
wherein a container including a heater and formed with a light entrance and a light exit has the optic gastightly sealed therein to form a thermostatic bath, and
wherein the control section carries out the temperature control of the heater to thereby change the optical length through the optic.

7. A spectroscopic apparatus that performs splitting of light, comprising:
an optical input-processing section that collects input light to form a collected beam;
an optic that includes a first reflection surface and a second reflection surface and causes the collected beam incident thereon to undergo multiple reflections within an inner region between the first reflection surface and the second reflection surface, to thereby cause split beams to be emitted via the second reflection surface;
a control section that variably controls at least one of an optical length and a spectral resolution of the optic; and
a received light-processing section including a rear-side condenser lens that collects the split beams emitted from the optic in a direction of light-splitting by the optic and in a direction perpendicular to a direction of light-splitting by the optic, a photodetector that detects an optical spectrum, and a light-splitting section that is disposed between the rear-side condenser lens and the photodetector, for splitting the beams in the direction perpendicular to the direction of light-splitting by the optic.

8. The spectroscopic apparatus according to claim 7, wherein the photodetector comprises a two-dimensional array of single photoreceptors.

9. The spectroscopic apparatus according to claim 7, wherein the photodetector comprises a one-dimensional array of single photoreceptors, and is moved in a direction perpendicular to a one-dimensional direction by the control section, for receiving the emitted beams.

10. The spectroscopic apparatus according to claim 7, wherein the photodetector comprises a single photoreceptor, and is moved in two-dimensional directions by the control section, for receiving the emitted beams.

11. The spectroscopic apparatus according to claim 7, wherein the light-splitting section comprises a diffraction grating pair formed by a first diffraction grating of a transmission type that splits beams in a direction perpendicular to the direction of light-splitting by the optic, and a second diffraction grating of a transmission type that forms the beams split by the first diffraction grating into collimated light beams.

12. The spectroscopic apparatus according to claim 11, wherein the control section provides control such that a distance between the first diffraction grating and the second diffraction grating opposed to each other is changed, to thereby cause the spectral resolution to be changed.

13. The spectroscopic apparatus according to claim 7, wherein the light-splitting section comprises a prism pair that splits the beams in a direction perpendicular to the direction of the light-splitting by the optic.

14. The spectroscopic apparatus according to claim 7, wherein the light-splitting section comprises a prism block that splits the beams in a direction perpendicular to the direction of light-splitting by the optic.

15. A spectroscopic apparatus that performs splitting of light, comprising:
an optical input-processing section that collects input light to form a collected beam;
an optic that includes a first reflection surface and a second reflection surface and causes the collected beam incident thereon to undergo multiple reflections within an inner region between the first reflection surface and the second reflection surface, to thereby cause split beams to be emitted via the second reflection surface;
a control section that variably controls at least one of an optical length and a spectral resolution of the optic; and
a received light-processing section including a rear-side condenser lens that collects the split beams emitted from the optic in a direction of light-splitting by the optic, a photodetector that detects an optical spectrum, and a light-splitting section that is disposed between the rear-side condenser lens and the photodetector, for splitting the beams in the direction perpendicular to the direction of light-splitting by the optic.

16. The spectroscopic apparatus according to claim 15, wherein the photodetector comprises a two-dimensional array of single photoreceptors.

17. The spectroscopic apparatus according to claim 15, wherein the photodetector comprises a one-dimensional array of single photoreceptors, and is moved in a direction perpendicular to a one-dimensional direction by the control section, for receiving the emitted beams.

18. The spectroscopic apparatus according to claim 15, wherein the photodetector comprises a single photoreceptor, and is moved in two-dimensional directions by the control section, for receiving the emitted beams.

19. The spectroscopic apparatus according to claim 15, wherein the light-splitting section comprises a diffraction grating of a transmission type that splits beams in a direction perpendicular to the direction of light-splitting by the optic, and a condenser lens that collects the beams split by the diffraction grating in a direction perpendicular to the direction of light-splitting by the optic, into collimated light beams.

20. The spectroscopic apparatus according to claim 15, wherein the light-splitting section comprises a diffraction grating of a reflection type that splits beams in a direction perpendicular to the direction of light-splitting by the optic, and a condenser lens that collects the beams split by diffraction grating in a direction perpendicular to the direction of light-splitting by the optic, into collimated light beams.

21. The spectroscopic apparatus according to claim 15, wherein the light-splitting section comprises a prism that splits the beams in a direction perpendicular to the direction of light-splitting by the optic, and a condenser lens that collects the beams splitting by the prism in a direction perpendicular to the direction of light-splitting by the optic, into collimated light beams.

* * * * *